United States Patent
Liebelt et al.

(10) Patent No.: US 11,360,717 B2
(45) Date of Patent: Jun. 14, 2022

(54) MODIFICATION OF ADVANCED FUNCTION PRESENTATION (AFP) PRINT JOBS FOR EXCEPTION HANDLING

(71) Applicants: Linda Sue Liebelt, Boulder, CO (US); Ned Otey, Louisville, CO (US); Jeffrey Alan Sikkink, Longmont, CO (US); David Laurence Wagner, Broomfield, CO (US); Marquis G. Waller, Beverly, OH (US)

(72) Inventors: Linda Sue Liebelt, Boulder, CO (US); Ned Otey, Louisville, CO (US); Jeffrey Alan Sikkink, Longmont, CO (US); David Laurence Wagner, Broomfield, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/805,266

(22) Filed: Feb. 28, 2020

(65) Prior Publication Data
US 2021/0271429 A1     Sep. 2, 2021

(51) Int. Cl.
*G06F 3/12*     (2006.01)

(52) U.S. Cl.
CPC ............ *G06F 3/1205* (2013.01); *G06F 3/125* (2013.01); *G06F 3/1247* (2013.01); *G06F 3/1297* (2013.01)

(58) Field of Classification Search
None
See application file for complete search history.

(56) References Cited

U.S. PATENT DOCUMENTS

| | | | |
|---|---|---|---|
| 8,582,132 B2 | 11/2013 | Ruehle et al. | |
| 8,885,184 B2 | 11/2014 | Alimpich et al. | |
| 10,387,085 B1 | 8/2019 | Koets et al. | |
| 2004/0239981 A1* | 12/2004 | Ducato | G06F 3/1247 358/1.15 |
| 2006/0242549 A1 | 10/2006 | Schwier et al. | |
| 2012/0013922 A1* | 1/2012 | Lotz | G06F 3/1208 358/1.9 |

(Continued)

FOREIGN PATENT DOCUMENTS

CN     107704479 A     2/2018

OTHER PUBLICATIONS

AFT to PDF transform (Nov. 2019). IBM Knowledge Center. Retrieved from https://www.ibm.com/support/knowledgecenter/en/SSLTBW_2.3.0/com.ibm.zos.v2r3.aokfa00/aokfa10218.htm.

*Primary Examiner* — Fan Zhang
(74) *Attorney, Agent, or Firm* — Duft & Bornsen, PC

(57) ABSTRACT

Embodiments described herein modify AFP translations of non-AFP print jobs in order to ensure that exceptions in the non-AFP print jobs are handled correctly. One embodiment comprises a controller that receives a job ticket for a non-AFP print job, where the job ticket defines at least one page exception for the non-AFP print job. The controller receives an AFP translation of the non-AFP print job, where the AFP translation does not implement the at least one page exception defined in the job ticket for the non-AFP print job. The controller modifies the AFP translation to include one or more structured fields based on the at least one page exception, and provides the modified AFP translation to a print server to generate a printed output that represents the non-AFP print job as specified by the job ticket.

24 Claims, 20 Drawing Sheets

(56) References Cited

U.S. PATENT DOCUMENTS

| | | | |
|---|---|---|---|
| 2012/0212775 A1* | 8/2012 | Jahn | G06F 3/1288 358/1.15 |
| 2014/0085649 A1* | 3/2014 | Hohensee | G06F 3/1298 358/1.13 |
| 2015/0146234 A1* | 5/2015 | Konuma | G06K 15/002 358/1.14 |
| 2019/0129660 A1 | 5/2019 | Liebelt et al. | |

* cited by examiner

MODIFICATION OF ADVANCED FUNCTION PRESENTATION (AFP) PRINT JOBS FOR EXCEPTION HANDLING

FIELD

This disclosure relates to the field of printing systems and, in particular, to modifying AFP translations prior to printing to implement job ticket exceptions.

BACKGROUND

In large enterprise document printing/presentation environments, various final form presentation datastream standards are used to provide for standardized, complete definition of the final form for printing or other presentation of a document file. As used herein, "final form" refers to the complete definition in the presentation document of all information to define the content of the document and the formatting for presentation to a user (e.g., printed, displayed, etc.). Some final form standards are referred to as a "datastream" in that they comprise a continuous stream of data defining a sequence of data representing a sequence of one or more sheet sides in a sequence of one or more documents.

The Advanced Function Presentation ("AFP") architecture, such as that specified by IBM and entitled "Mixed Object Document Content Architecture" ("MO:DCA"-IBM document SC31-6802 which is hereby incorporated by reference), is exemplary of a final form presentation datastream and is often applied to high volume transaction processing printing and presentation environments.

The AFP architecture is a broad specification applicable across an industry of transaction print processing/presentation applications and enterprises. The AFP architecture family of specifications generally specifies the format of files for presentation information including the information to be presented as well as commands and directives (e.g., AFP structured fields) that define intended manner of presentation for the information content within the AFP file. In general, information in an AFP file is referred to as "components" and the file itself may often be referred to as a "document". In AFP terminology, a "print file" may contain one or more documents. For purposes of this presentation, the distinction is not important and thus "print file" and "document" may be used interchangeably.

Because MO:DCA is a low level datastream that is considered "final form", MO:DCA was not designed to be manipulated after composition to correct issues that may have arisen during composition. Thus, it is desirable to make changes to AFP print jobs prior to printing in order to correct possible errors and ensure a correctly printed output.

SUMMARY

Embodiments described herein modify AFP translations of non-AFP print jobs in order to ensure that exceptions in the non-AFP print jobs are handled correctly. In particular, problems may arise when a print shop attempts to translate non-AFP jobs into AFP when the non-AFP jobs utilize separate files, such as job tickets, to identify the exceptions in the job. During translation, exception information may be left out, which may result in an incorrectly printed output at the print shop. The embodiments described herein modify an AFP translation of the non-AFP job, which may not include page exceptions specified in a job ticket for the non-AFP job, using page exceptions defined in a job ticket for the non-AFP job. The result of modifying the AFP translation is that the shop is able to correctly generate a printed output of the non-AFP print job that is based on the exception information defined in the job ticket, thereby improving the capabilities of the shop.

One embodiment comprises a controller that receives a job ticket for a non-AFP print job, where the job ticket defines at least one page exception for the non-AFP print job. The controller receives an AFP translation of the non-AFP print job, where the AFP translation does not implement the at least one page exception defined in the job ticket for the non-AFP print job. The controller modifies the AFP translation to include one or more structured fields based on the at least one page exception, and provides the modified AFP translation to a print server to generate a printed output that represents the non-AFP print job as specified by the job ticket.

Another embodiment comprises a method of modifying AFP translations of non-AFP print jobs to handle page exceptions. The method comprises receiving a job ticket for the non-AFP print job, where the job ticket defines at least one page exception for the non-AFP print job. The method further comprises receiving an AFP translation of the non-AFP print job, where the AFP translation does not implement the at least one page exception defined in the job ticket for the non-AFP print job. The method further comprises modifying the AFP translation to include one or more structured fields based on the at least one page exception, and providing the modified AFP translation to a print server to generate a printed output that represents the non-AFP print job as specified by the job ticket.

Another embodiment comprises a non-transitory computer-readable medium including programmed instructions which, when executed by a processor, direct the processor to receive a job ticket for a non-AFP print job, where the job ticket defines at least one page exception for the non-AFP print job. The instructions further direct the processor to receive an AFP translation of the non-AFP print job, where the AFP translation does not implement the at least one page exception defined in the job ticket for the non-AFP print job. The instructions further direct the processor to modify the AFP translation to include one or more structured fields based on the at least one page exception, and provide the modified AFP translation to a print server to generate a printed output that represents the non-AFP print job as specified by the job ticket.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
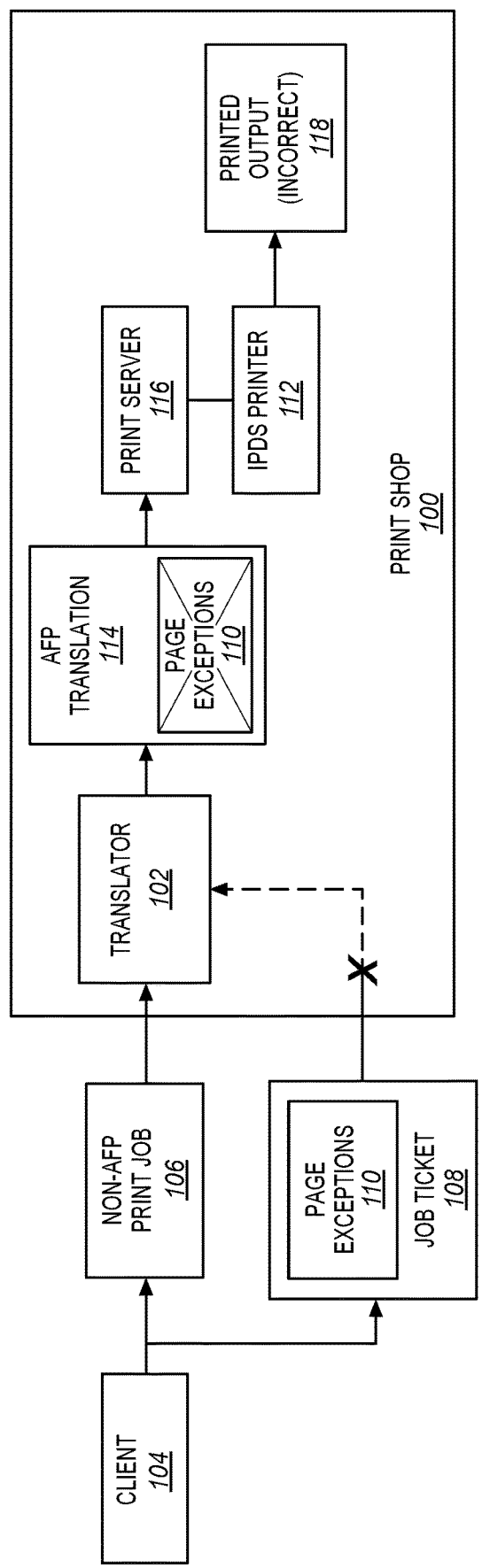
FIG. 1 is a block diagram of a print shop in the prior art.

FIG. 1 is a block diagram of a print shop 100 in the prior art. In FIG. 1, a client 104 submits a non-AFP print job 106 to print shop 100 for printing along with a job ticket 108. In this embodiment, non-AFP print job 106 comprises a Page Description Language (PDL) that defines the contents of one or more documents to be printed. Job ticket 108 defines how to print one or more documents in non-AFP print job 106. The types of information that may be included in job ticket 108 include the plex information for pages and/or documents in non-AFP print job 106 (e.g., simplex, duplex, etc.), the type of media to use when printing the pages and/or documents in non-AFP print job 106 (e.g., A4, letter, legal, etc.), post-processing instructions for the pages and/or documents in non-AFP print job 106 (e.g., stapling, folding, punch, etc.), the number of copies to print, and/or the n-up formatting of the pages.

While an AFP print job includes all the information needed to correctly generate a printed output, including the exception information often found in job ticket 108, other types of non-AFP print jobs (e.g., a Portable Document Format (PDF) job) use a separate file, such as job ticket 108 (e.g., PDF jobs use Job Definition Format (JDF) tickets), that defines the exception information for the job. Thus, problems may arise when converting non-AFP print job 106 into AFP print jobs, when job ticket 108 includes page exceptions 110.

In FIG. 1, job ticket 108 includes one or more page exceptions 110, which define changes in the how pages in non-AFP print job 106 are processed during printing. For example, page exceptions 110 may define changes in the type of media while printing non-AFP print job 106 (e.g., printing some pages of non-AFP print job 106 in blue and other pages in red), changes in the plex while printing non-AFP print job 106 (e.g., pages 1-2 are printed duplex, while pages 3-10 are simplex), changes in post processing instructions for pages in non-AFP print job 106 (e.g., pages 5-7 are stapled, and pages 1-4 and 8-9 are not.), changes in the number of copies printed for different pages, changes in the n-up formatting of for different pages, etc. Thus, correctly generating a printed output for non-AFP print job 106 relies both on the PDL data in non-AFP print job 106 along with the page exceptions 110 defined in job ticket 108.

In FIG. 1, print shop 100 utilizes an Intelligent Printer Data Stream (IPDS) printer 112, which may not be capable of printing non-AFP print job 106 directly. For example, IPDS printer 112 may not have the capability to accept other types of formatted data other than IPDS. Thus, when print shop 100 receives non-AFP print job 106 and job ticket 108 from client 104, print shop 100 utilizes a translator 102 that converts non-AFP print job 106 into an AFP translation 114 (e.g., a translation of the PDL in non-AFP print job 106 into MO:DCA), which may not accurately represent page exceptions 110 from job ticket 108. AFP translation 114 is provided to a print server 116, which converts AFP translation 114 into an IPDS data stream that is submitted to IPDS printer 112 for printing non-AFP print job 106.

Problems may arise when translator 102 fails to process page exceptions 110 in job ticket 108 correctly or at all. For instance, translator 102 may simply convert non-AFP print job 106 into AFP translation 114 and ignore page exceptions 110 in job ticket 108, which results in AFP translation 114 being generated without the correct print control information. When print server 116 converts AFP translation 114 into an IPDS data stream for IPDS printer 112, IPDS printer 112 generates a printed output 118 that is incorrect because the print control information is missing or incomplete. For example, printed output 118 may not reflect the page exceptions 110 specified in job ticket 108 (e.g., printed output 118 may be generated with incorrect print control information that should have been implemented in AFP translation 114).

In the embodiments described herein, page exceptions 110 in job ticket 108 are processed along with AFP translation 114 generated by translator 102 to generate a modified AFP translation that properly reflects both the printable output of non-AFP print job 106 and page exceptions 110 defined in job ticket 108. For example, job tickets for PDF jobs describe exception information on a page-by-page basis, while AFP describes exception information on a page-range basis. Thus, the process used when page exceptions 110 apply to a PDF print job is to convert the page-level exceptions defined in a JDF ticket to page-range exceptions that can be used to correct the imperfect translation of non-AFP print job 106 by translator 102. The various details of this activity will be described in further detail below, after a short description of AFP in general.

Figure 2:
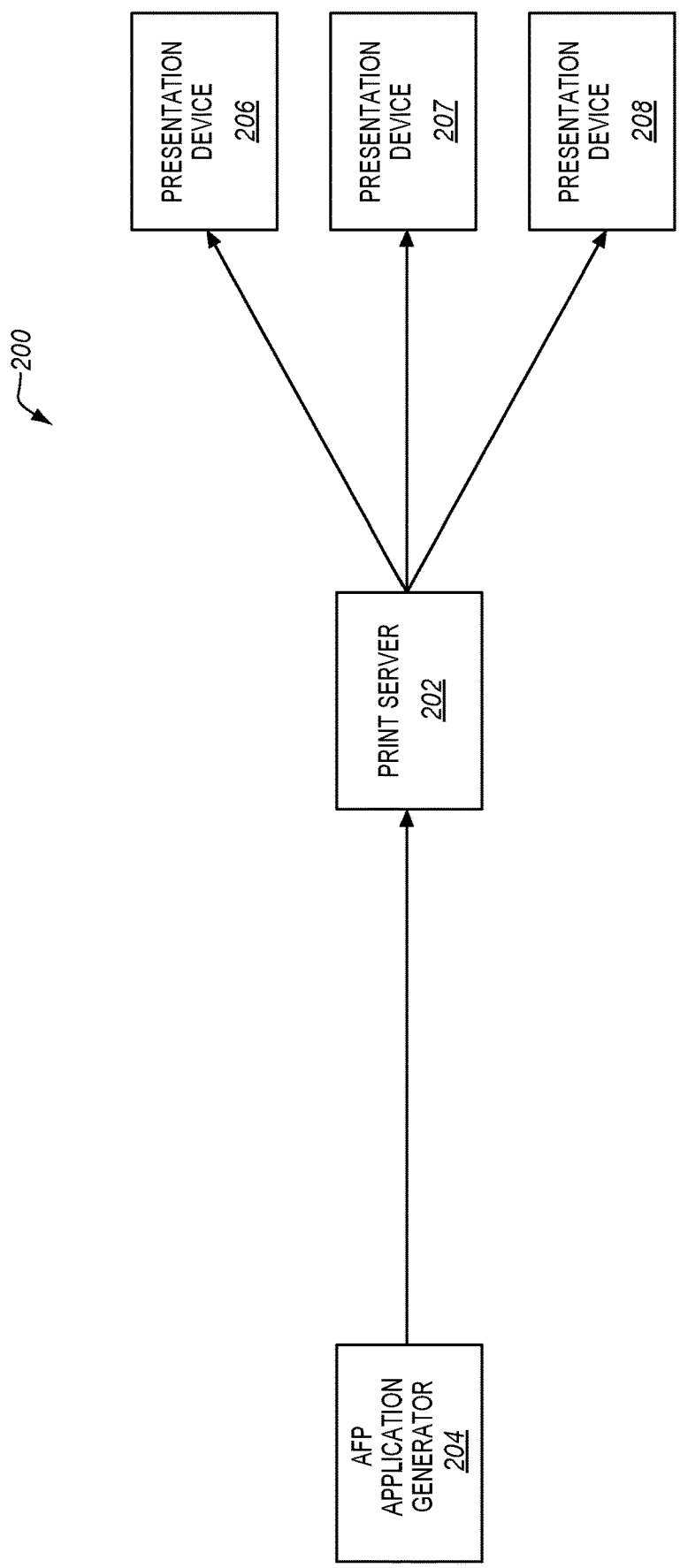
FIG. 2 is a block diagram of an AFP architecture in an illustrative embodiment.

FIG. 2 is a block diagram of an AFP architecture 200 in an illustrative embodiment. In this embodiment, AFP architecture 200 utilizes a print server 202, which receives AFP documents, processes them, and forwards them as a data stream to one or more presentation devices 206-208. Some examples of presentation devices 206-208 include printers, print engines, print controllers, displays, etc.

In AFP architecture 200, a Mixed Object Document Content Architecture (MO:DCA) document is provided to print server 202. Print server 202 then generates an IPDS command stream for sending to presentation devices 206-208 for the purpose of outputting (e.g., presenting) the document. In its most complex form, a MO:DCA document contains data objects along with data structures which define the document's layout and composition features. This form is called a MO:DCA presentation document.

In FIG. 2, an AFP application generator 204 sends a MO:DCA document to print server 202 for outputting. For example, a client may use AFP application generator 204 to generate an AFP print job for printing by a print shop. When print server 116 receives the MO:DCA document from AFP application generator 204, it processes the document by converting it to an IPDS command stream for forwarding to one or more presentation devices 206-208.

The components of an MO:DCA document are defined by the AFP standards with a syntax which consists of self-describing structures. Structured fields are the main MO:DCA structures and these are used to encode MO:DCA commands. A structured field starts with an introducer which uniquely identifies the command, provides a total length for the command, and specifies additional control information such as whether padding bytes are present. The introducer is followed by up to 32,759 data bytes. Data may be encoded using fixed parameters, repeating groups, keywords, and triplets. Fixed parameters have a meaning only in the context of the structure that includes them. Repeating groups are used to specify a grouping of parameters which can appear multiple times. Keywords are self-identifying parameters which consist of a one-byte unique keyword identifier followed by a one-byte keyword value. Triplets are self-identifying parameters which contain a one-byte length, a one-byte unique triplet identifier, and up to 252 data bytes. Keywords and triplets have the same semantics wherever they are used. Together, these structures define a syntax for MO:DCA documents which provides for orderly parsing and flexible extensibility.

A MO:DCA print file is defined in a hierarchy of components and the print file component is the highest level of the hierarchy. Document components are at the next level and can be made up of pages, and page components are at the intermediate level of the hierarchy. Further, pages can be made up of objects and objects components are at the lowest level of the hierarchy. Further, groups of pages may exist within a print-file, and define individual mail pieces, customer statements, or other indivisible groups of pages subject to presentation or regulatory requirements. Object components may be, for example, bar codes, graphics, images, and presentation text. Multiple documents can be grouped together into a print-file.

At each level of the hierarchy certain sets of MO:DCA structured fields are permissible. The document, pages and objects are bounded by a pair of structured fields, known as begin-end pairs, which define a presentation wrapper for the data stream components.

Figure 3:
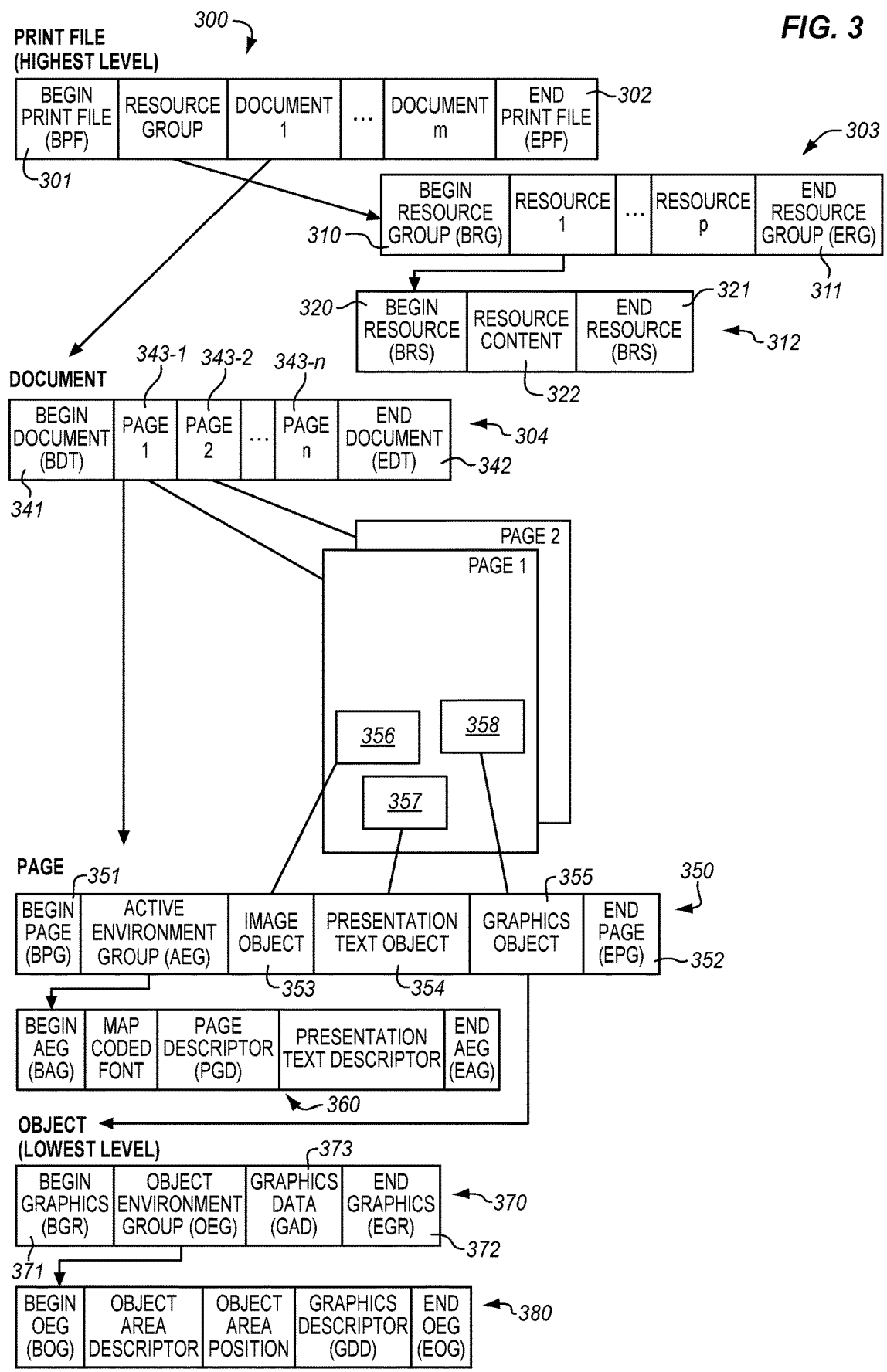
FIG. 3 is a diagram which depicts the main components of a MO:DCA print file in an illustrative embodiment.
Figure 4:
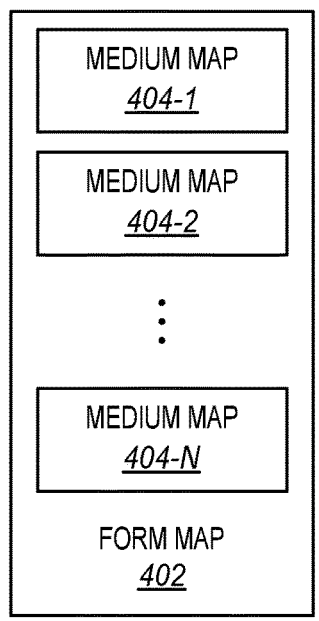
FIG. 4 is a block diagram of a form map that includes different medium maps in an illustrative embodiment.
Figure 5:
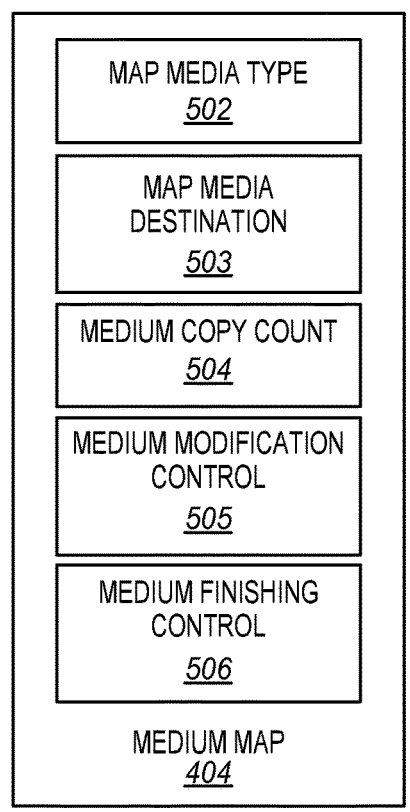
FIG. 5 is a block diagram depicting different structured fields that may be included within a medium map in an illustrative embodiment.
Figure 6:
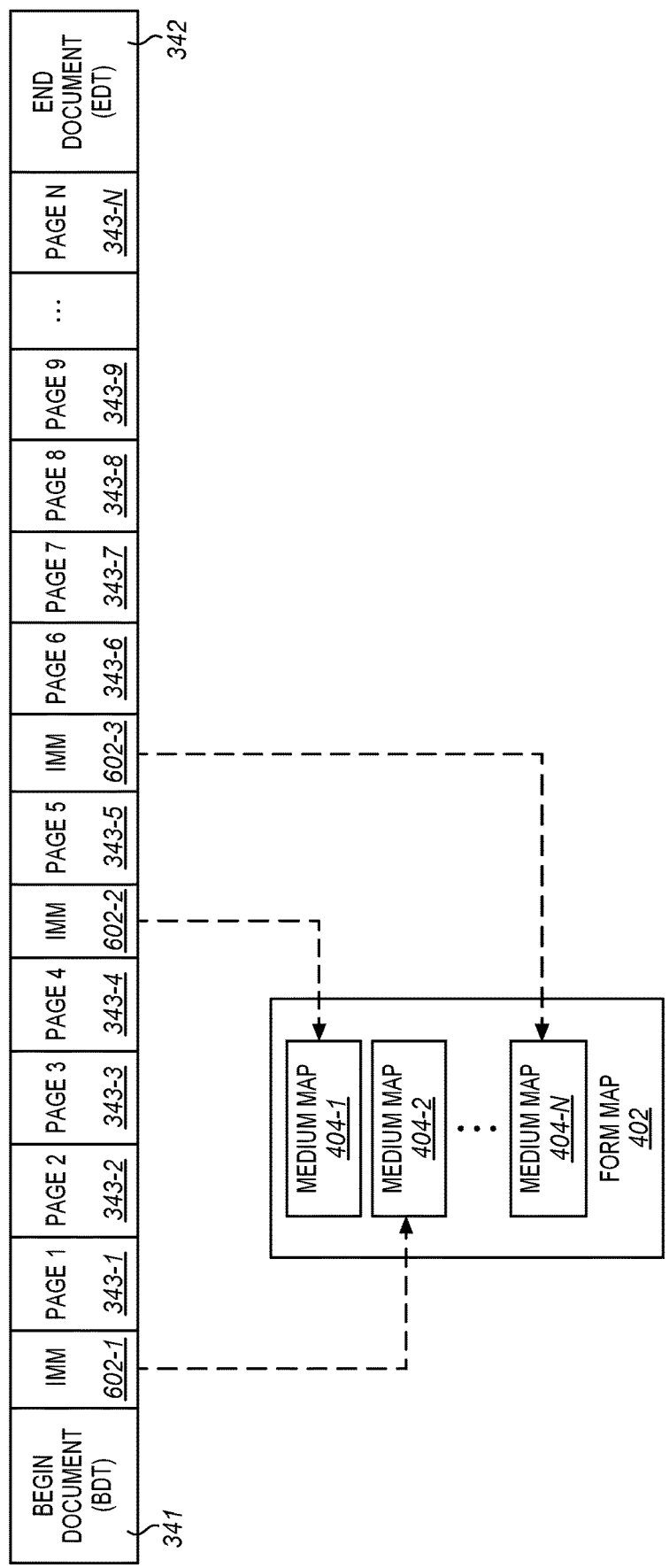
FIG. 6 is a block diagram of an AFP document component in an illustrative embodiment.

FIG. 3 is a diagram which depicts the main components of a MO:DCA print file 300 in an illustrative embodiment. FIGS. 4-6 are block diagrams of different components of print file 300 in illustrative embodiments. Print file 300 is defined by a begin-end pair comprising a "Begin Print File" (BPF) structured field 301 and ends with an "End Print File" (EPF) structured field 302. Print file 300 includes a number of components, including at least one document 304 for printing. Document 304 comprises multiple pages, and the content of page one 343-1 is illustrated. Page one 343-1 contains an image object 356, a section of text 357, and a graphics object 358 such as a bar chart.

Document 304 is defined by a begin-end pair comprising a "Begin Document" (BDT) structured field 341 and ends with an "End Document" (EDT) structured field 342. Each page 343 within document 304 is independent from any other page 343 and the BDT structured field is followed by page components 350 of each page 343 to be printed. Each page component 350 is defined by a begin-end pair comprising a "Begin Page" (BPG) structured field 351 and an "End Page" (EPG) structured field 352. BPG structured field 351 is followed by an Active Environment Group (AEG) 360 which defines resource and layout information for the page such as measurement units, page width, and page depth. Page component 350 also includes details of each of the objects which make up the page. These details comprise image object details 353, presentation text object details 354, and graphics object details 355. For example, Graphics objects details 355 are contained in a graphic object component 370 which is defined by a begin-end pair comprising a "Begin Graphics Object" (BGR) structured field 371 and an "End Graphics Object" (EGR) structured field 372. The BGR structured field 371 is followed by an Object Environment Group (OEG) 380 and graphics object data 373. OEG 380 defines resource and layout information for the graphics object such as placement and orientation of the graphics object on the page. Note that, although not shown in FIG. 3, image object details 353 and presentation text object details 354 will comprise an image object component and a presentation text component, respectively, which are similar to the graphics object component 370 but with appropriate begin-end pairs. Similarly, although not shown in FIG. 3, "Begin Named Group" (BNG) and "End Named Group" (ENG) structures can create groups of pages.

Note that alternatively to including the actual data object in the MO:DCA document as shown in FIG. 3 for graphics object data 373, a reference to the data object can be included. For example, the reference to the data object can be contained in a resource object component instead of a data object component, such a resource object component being defined by a begin-end pair comprising a Begin Resource (BRS) structured field and an End Resource (ERS) structured field. Further such a resource object can include reference to a secondary resource object.

In addition to document 304, print file 300 also includes a resource group 303. Resource group 303 is defined by its begin-end pairs 310-311, and defines one or more resources 312. In this embodiment, resource 312 is defined by its begin-end pairs 320-321, and includes resource content 322, which comprises a form map 402 (see FIG. 4). In MO:DCA, form map 402 is a print control resource that is used to control the presentation of pages on physical media, also known as forms or sheets, at a printer. Form map 402 includes one or more medium maps 404 that are invokable on document and page boundaries and that specify a complete set of print controls. The name assigned to each medium map 404 is unique within form map 402. Generally, medium maps 404 can be invoked by name on any page boundary in document 304. This is done by including an Invoke Medium Map (IMM) structured field in the document data stream. Multiple IMM structured fields may be used within document 304 in order to modify the print control of document 304 during printing and/or post-processing activities.

FIG. 5 depicts some of the different structured fields that may be included within medium maps 404, and FIG. 6 depicts how IMM structured fields and medium maps 404 may be used in in document 304 to implement print control changes. FIG. 5 only depicts some of the structured fields that may be implemented in medium maps 404. In particular, the structured fields shown in FIG. 5 specifically relate to information used to define print control changes in media type, media destination, copy count, post-processing, plex, and n-up printing in AFP.

As discussed previously, medium maps 404 are used to implement print control changes in document 304, with the various structured fields in medium maps 404 controlling different aspects of the print control changes that are desired for a page or a range of pages 343 in document 304. Each medium map 404 is invokable on a page boundary by an IMM structured field, which references a specific medium map 404. Further, each medium map 404 includes a complete set of print controls that are applied to a page or range of pages in document 304. Generally, the print control implemented using the IMM structured field and its invoked medium map 404 remain in effect until a subsequent (if any) IMM structured field invokes a different medium map 404 that defines a different set of print controls for the pages that follow. Some of the MO:DCA structured fields in medium maps 404 that are used to modify print control in document 304 will be discussed next.

A Map Media Type (MMT) 502 structured field maps a media type local ID to the name or OID of a media type. For example, an MMT 502 structured field in medium map 404 may specify A4 white, A5 colored, legal white, etc., as the media to use for a page or range of pages in document 304. If document 304 used A4 for some pages and letter for other pages during printing, then two different medium maps 404 would be defined in form map 402, each having a unique MMT 502 structured field that specifies either A4 or letter media. Within document 304, IMM structured fields invoke the correct medium maps 404 at page boundaries where the media type changes would occur. Referring to FIG. 6, for example, if page one 343-1 to page four 343-4 in document 304 are specified to print on A4 media, then an MMT 502 structured field specifying A4 media would be included in medium map 404-2, with an IMM 602-1 structured field invoking medium map 402-2 also included in document 304 at the page boundary before page one 343-1. If page five 343-5 in document 304 is specified to print on letter media, then an MMT 502 structured field specifying letter media would be included in medium map 404-1, with an IMM 602-2 structured field invoking medium map 404-1 also included in document 304 at the page boundary between page four 343-4 and page five 343-5. This is one method that MO:DCA uses to handle media exceptions, which are changes in the type of media used when printing document 304.

A Map Media Destination (MMD) 503 structured field maps a media destination local ID to the name of a media destination. For example, an MMD 503 structured field in a medium map 404 may specify document tray one, document tray two, etc., as the media destination to use for a page or range of pages in document 304. If document 304 used document tray one for some pages and document tray two for other pages, then two different medium maps 404 would be defined in form map 402, each having a unique MMD 503 structured field that specifies either document tray one or document tray two. Within document 304, IMM 602 structured fields would be present at page boundaries where the media destination changes would occur. Referring to FIG. 6, for example, if page one 343-1 to page four 343-4 in document 304 are specified to output to document tray one, an MMD 503 structured field would be included in medium map 404-2 specifying document tray one, with an IMM 602-1 structured field invoking medium map 404-2 also included in document 304 at the page boundary before page one 343-1. If page five 343-5 in document 304 is specified to output to document tray two, then an MMD 503 structured field would be included in in medium map 404-1 specifying document tray two, with an IMM 602-2 structured field invoking medium map 404-1 also included in document 304 at the page boundary between page four 343-4 and page five 343-5. This is one method that AFP uses to handle media destination exceptions, which are changes in the output destination when printing document 304.

A Medium Copy Count (MCC) 504 structured field specifies the number of copies of each medium, or sheet. This specification is called a copy group. A MCC 504 structured field contains repeating groups that specify copy subgroups, such that each copy subgroup may be specified independently of any other copy subgroup. For each copy subgroup, the number of copies, as well as the modifications to be applied to each copy (via a Medium Modification Control (MMC) 505 structured field, described below), is specified by the repeating group. If the modifications for a copy subgroup specify duplexing, that copy subgroup and all successive copy subgroups are paired such that the first copy subgroup in the pair specifies the copy count as well as the modifications to be applied to the front side of each copy, and the second copy subgroup in the pair specifies the same copy count as well as an independent set of modifications to be applied to the back side of each copy. The pairing of copy subgroups continues as long as duplexing is specified. Only one MCC 504 structured field is included in each medium map 404, although the MCC 504 structured field in a medium map 404 may refer to one or more MMC 505 structured fields.

A Medium Modification Control (MMC) 505 structured field specifies the medium modifications to be applied for a copy subgroup specified in the MCC 504 structured field. For example, an MMC 505 structured field in a medium map 404 specifies simplex, normal duplex, tumble duplex, 1-up formatting, 2-up formatting, 3-up formatting, and 4-up formatting for a copy subgroup specified in an MCC 504 structured field. If document 304 specified 1-copy simplex for some pages and 2-copy duplex for other pages, then two different medium maps 404 would be defined in form map 402, each having a unique combination of an MCC 504 structured field that specified the number of copies and an MMC 505 structured field referenced by the MCC 504 structured field that specified the plex. Within document 304, IMM 602 structured fields would invoke the correct medium maps 404 at page boundaries where the copy/plex/n-up changes would occur. If document 304 was specified as single copy, but specified 1-up formatting for some pages and 2-up formatting for other pages, then two different medium maps 404 would be defined in form map 402, each having a unique combination of an MCC 504 structured field that specified the number of copies and an MMC 505 structured field referenced by the MCC 504 structured field that specified the n-up formatting. Within document 304, IMM 602 structured fields would invoke the correct medium maps 404 at page boundaries where the n-up formatting changes would occur.

Referring to FIG. 6, for example, if page one 343-1 to page four 343-4 in document 304 are specified as single copy 1-up formatting, then a MCC 504 structured field specifying one copy would reference an MMC 505 structured field specifying 1-up formatting in medium map 404-2, and an IMM 602-1 structured field invoking medium map 404-2 would be included in document 304 at the page boundary before page one 343-1. If page six 343-6 to page n 343-n are specified as two copy 2-up formatting, then a MCC 504 structured field specifying two copies would reference a MCC 504 structured field specifying 2-up formatting in medium map **404-*n*, and an IMM 602-3 structured field invoking medium map 404-*n* would be included in document 304 at the page boundary between page five 343-5 and page six 343-6. This is one method that MO:DCA uses to handle copy, plex, and n-up formatting exceptions, which are changes in copy, plex, and n-up formatting for pages 343 in document 304**.

A Medium Finishing Control (MFC) 506 structured field specifies the finishing requirements for physical media. For example, an MFC 506 structured field in a medium map 404 specifies stapling, no stapling, etc., as the finishing requirement for a page or range of pages in document 304. If document 304 specified stapling for some pages and no stapling for other pages, then two different medium maps 404 would be defined in form map 402, each having a unique MFC 506 structured field that specifies either stapling or no stapling. Within document 304, IMM 602 structured fields would invoke the correct medium maps 404 at page boundaries where the finishing changes would occur. Referring to FIG. 6, for example, if page one 343-1 to page four 343-4 in document 304 are specified to be stapled, then an MFC 506 structured field in medium map 404-2 would specify stapling, and an IMM 602-1 structured field invoking medium map 404-2 would be included in document 304 at the page boundary before page one 343-1. If page six 343-6 to page n **343-*n* are specified not to be stapled, then an MFC 506 structured field may in medium map 404-*n* would specify no stapling, and an IMM 602-2 structured field invoking medium map 404-*n* would be included in document 304 at the page boundary between page five 343-5 and page six 343-6. This is one method that MO:DCA uses to handle finishing exceptions, which are changes in the finishing options for pages 343 in document 304**.

Although the structured fields in FIG. 5 have been described individually with respect to how exceptions are handled in AFP, various combinations are used when handling exceptions. For example, when page one 343-1 to page four 343-4 in document 304 are printed on A4 and output to document tray one, medium map 404-2 would include both an MMT 502 structured field specifying A4 type media and an MMD 503 structured field specifying document tray one, with IMM 602-1 invoking medium map 404-2 at the page boundary prior to page one 343-1. A more detailed discussion of these types of activities will be discussed later.

Figure 7:
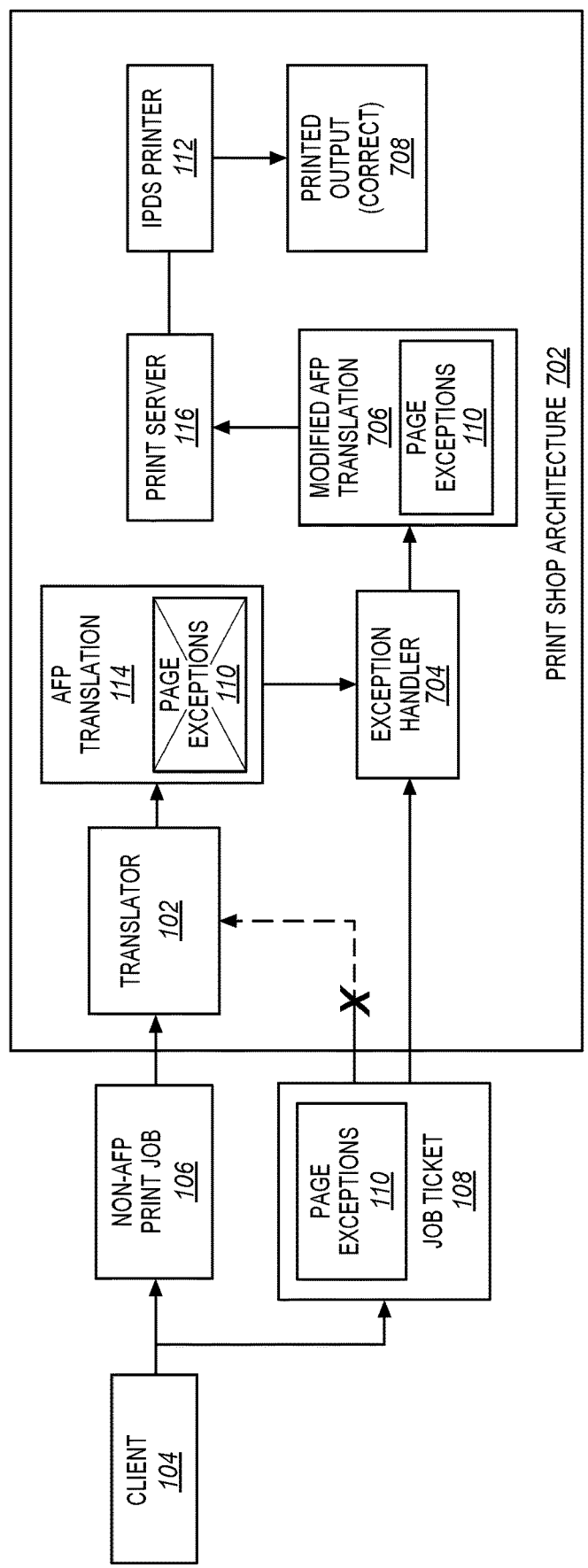
FIG. 7 is a block diagram of a print shop architecture in an illustrative embodiment.

FIG. 7 is a block diagram of a print shop architecture 702 in an illustrative embodiment. Print shop architecture 702 includes translator 102, print server 116, and IPDS printer 112, all previously described. Client 104 may submit non-AFP print job 106 and job ticket 108 to print shop architecture 702 for printing. However, unlike print shop 100 previously described in FIG. 1, print shop architecture 702 has been enhanced to correctly print non-AFP print job 106 using an exception handler 704. In this embodiment, exception handler 704 comprises any component, system, or device that processes both job ticket 108 and AFP translation 114 to generate a modified AFP translation 706, which, unlike AFP translation 114, correctly implements page exceptions 110 from job ticket 108. Thus, when print server 116 converts modified AFP translation 706 into an IPDS command stream for IPDS printer 112, a printed output 708 is correctly generated that represents non-AFP print job 106 and its associated page exceptions 110 in job ticket 108.

Figure 8:
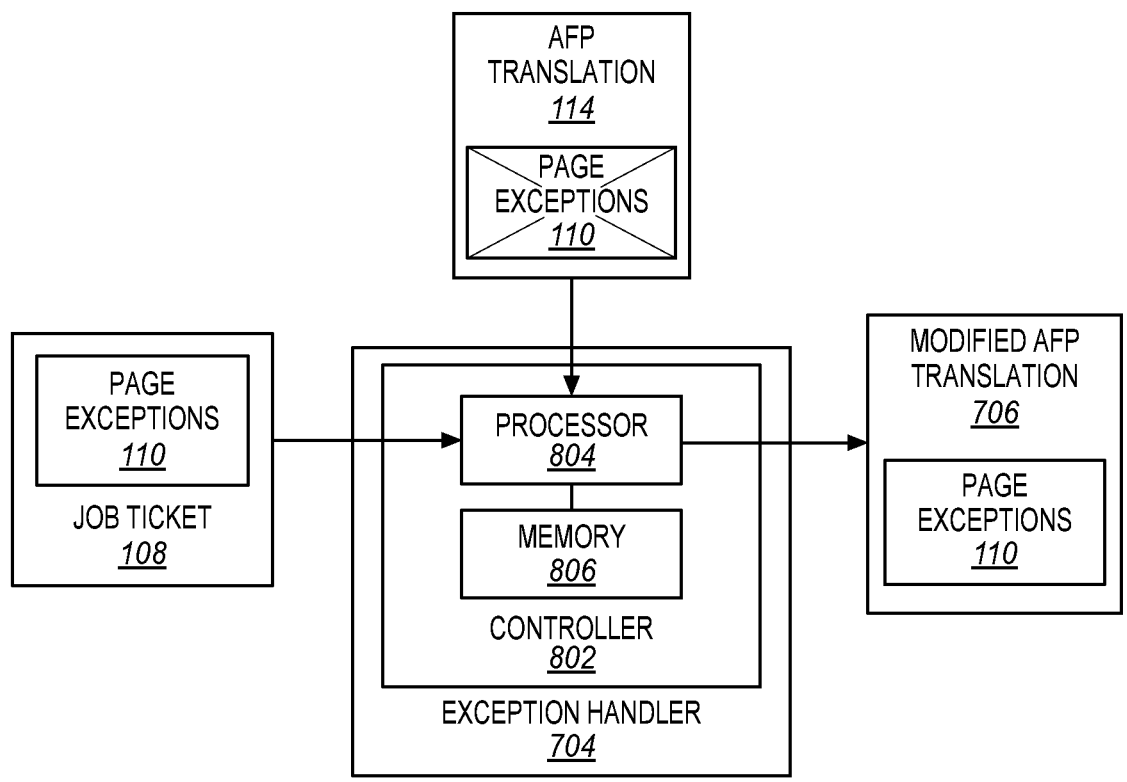
FIG. 8 is a block diagram depicting additional details for an element of FIG. 5 in an illustrative embodiment.

FIG. 8 is a block diagram depicting additional details for exception handler 704 of FIG. 7 in an illustrative embodiment. In this embodiment, exception handler 704 includes a controller 802. Controller 802 includes any physical components, and/or physical systems, and/or physical devices that are capable of implementing the functionality described herein for exception handler 704. While the specific physical implementation of controller 802 is subject to design choices, one particular embodiment may include one or more processors 804 coupled with a memory 806. Processor 804 includes any electronic circuits and/or optical circuits that are able to perform functions. The term "circuits" used herein refers to a physical implementation of hardware that is capable of performing the described functionality. Processor 804 may include one or more Central Processing Units (CPU), microprocessors, Digital Signal Processors (DSPs), Application-specific Integrated Circuits (ASICs), Programmable Logic Devices (PLDs), Field-Programmable Gate Arrays (FPGA), etc. Some examples of processors include INTEL® CORE™ processors, Advanced Risk Machines (ARM®) processors, etc.

Memory 806 includes any electronic circuits and/or optical circuits and/or magnetic circuits that are able to store data. For instance, memory 806 may store one or more portions of job ticket 108 and/or one or more portions of AFP translation 114 during processing, which may be used by processor 804 to generate modified AFP translation 706. Memory 806 may include one or more volatile or non-volatile Dynamic Random-Access Memory (DRAM) devices, FLASH devices, volatile or non-volatile Static RAM devices, hard drives, Solid State Disks (SSDs), shift registers, etc. Some examples of non-volatile DRAM and SRAM include battery-backed DRAM and battery-backed SRAM.

In this embodiment, consider that client 104 provides non-AFP print job 106 and job ticket 108 to print shop architecture 702 (see FIG. 7). Translator 102 converts non-AFP print job 106 into AFP translation 114, which does not implement one or more of page exceptions 110 from job ticket 108.

Figure 9:
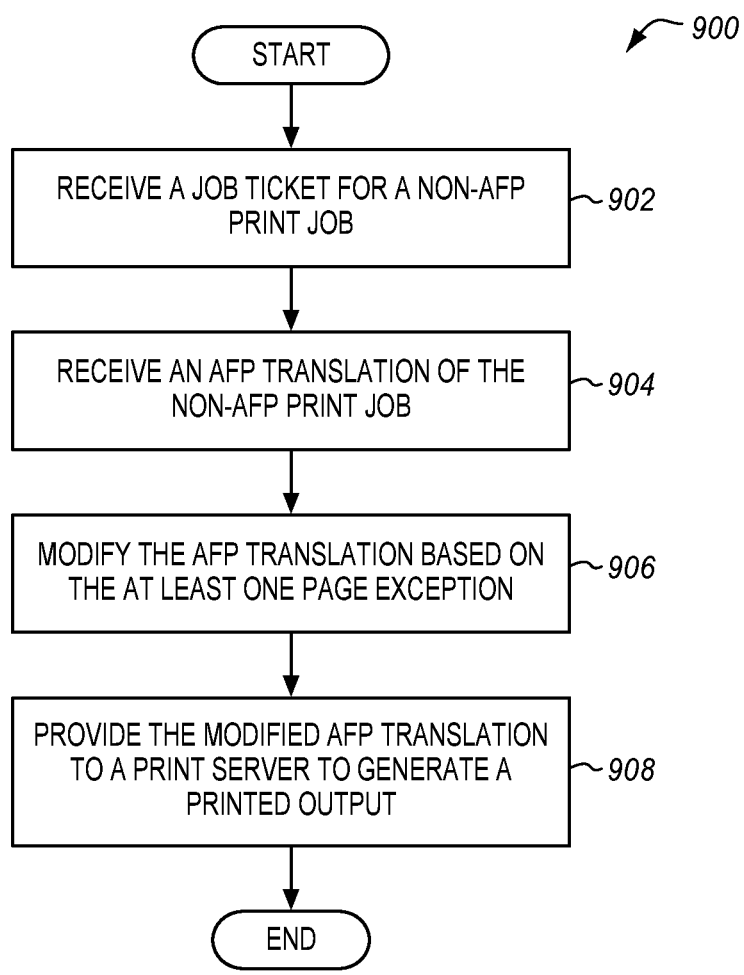
FIG. 9 is a flow chart of a method of modifying AFP translations to handle page exceptions in an illustrative embodiment.
Figure 10:
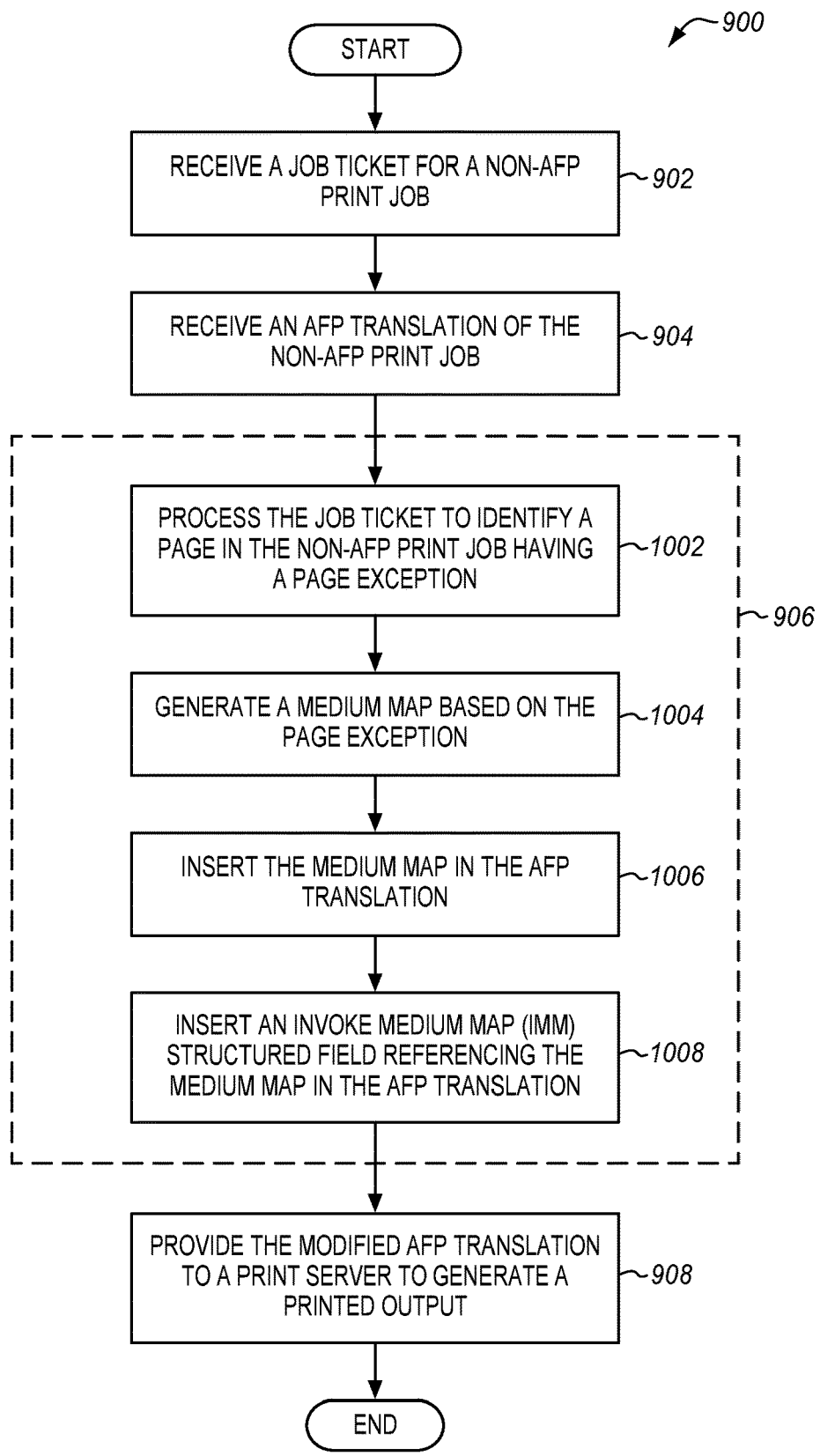
FIGS. 10-15 are flow charts depicting additional details of the method of FIG. 9 in various illustrative embodiments.
Figure 11:
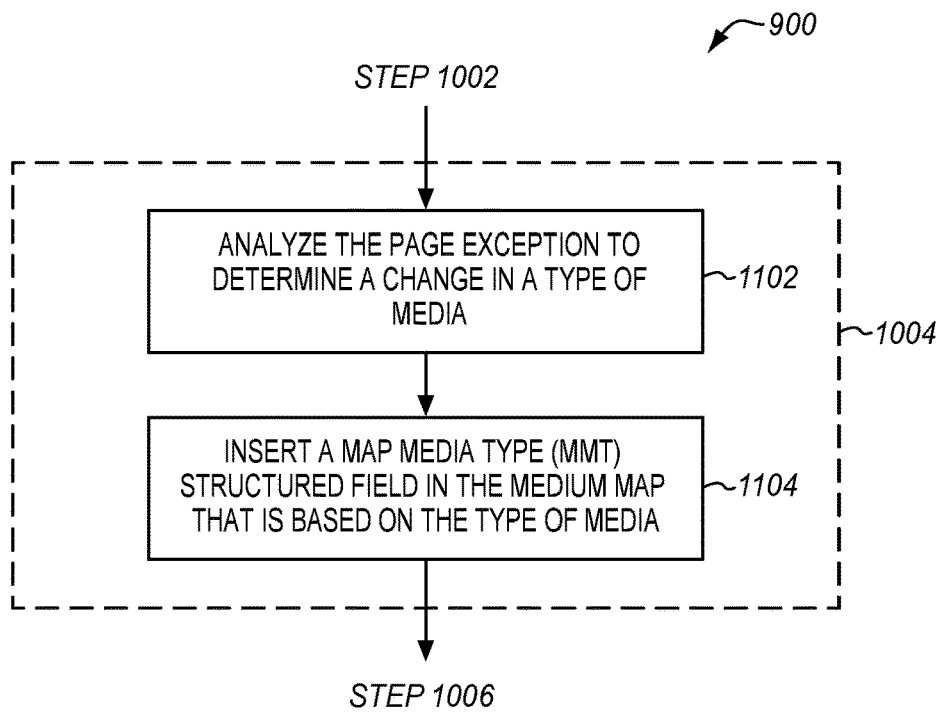
Figure 12:
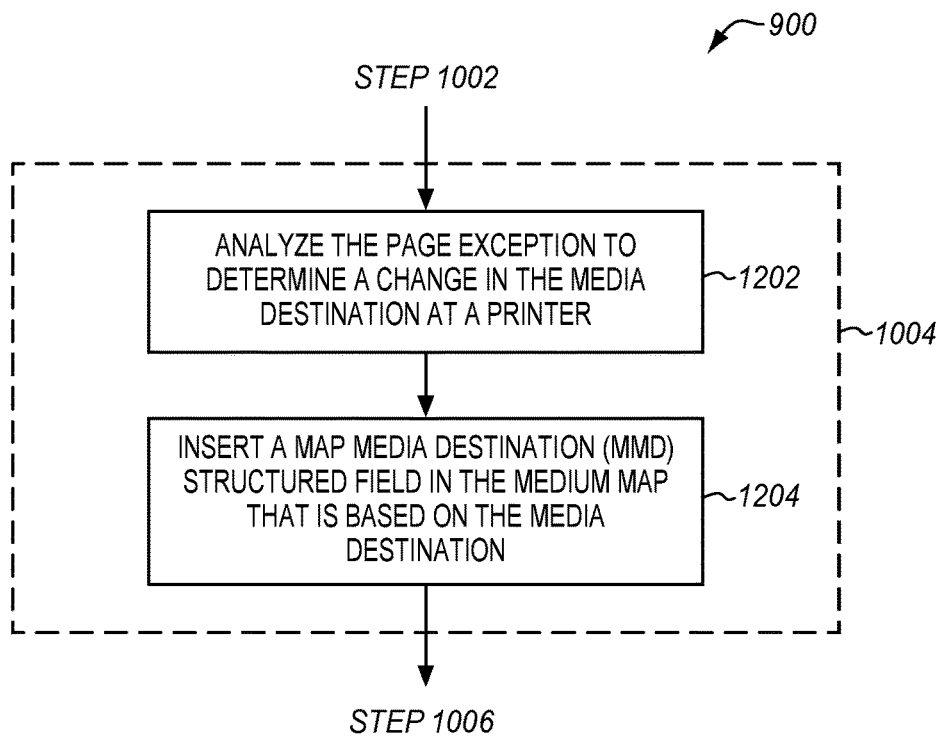
Figure 13:
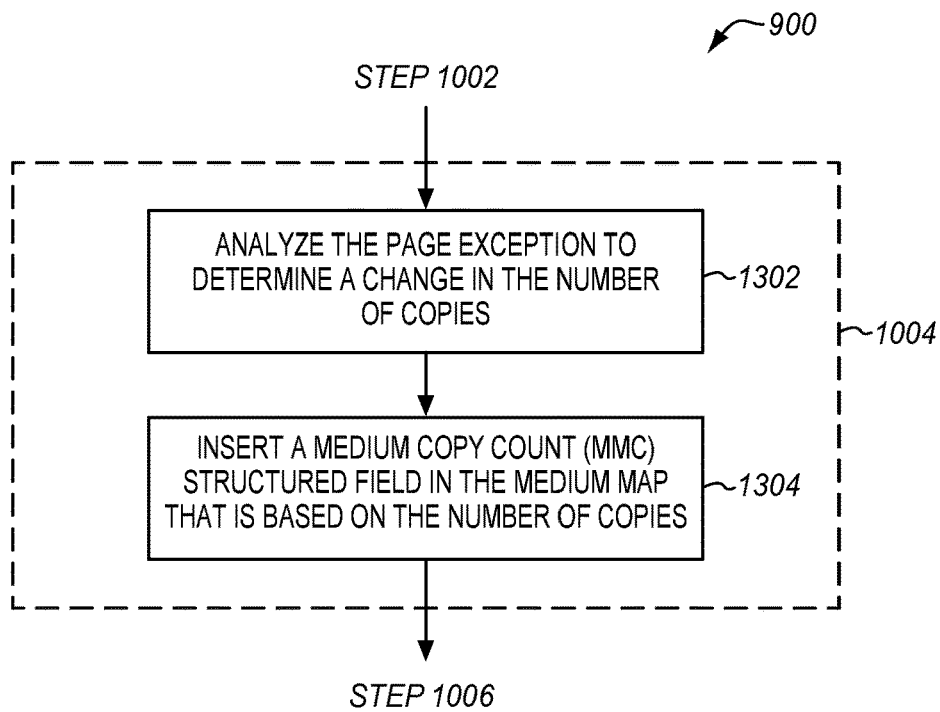
Figure 14:
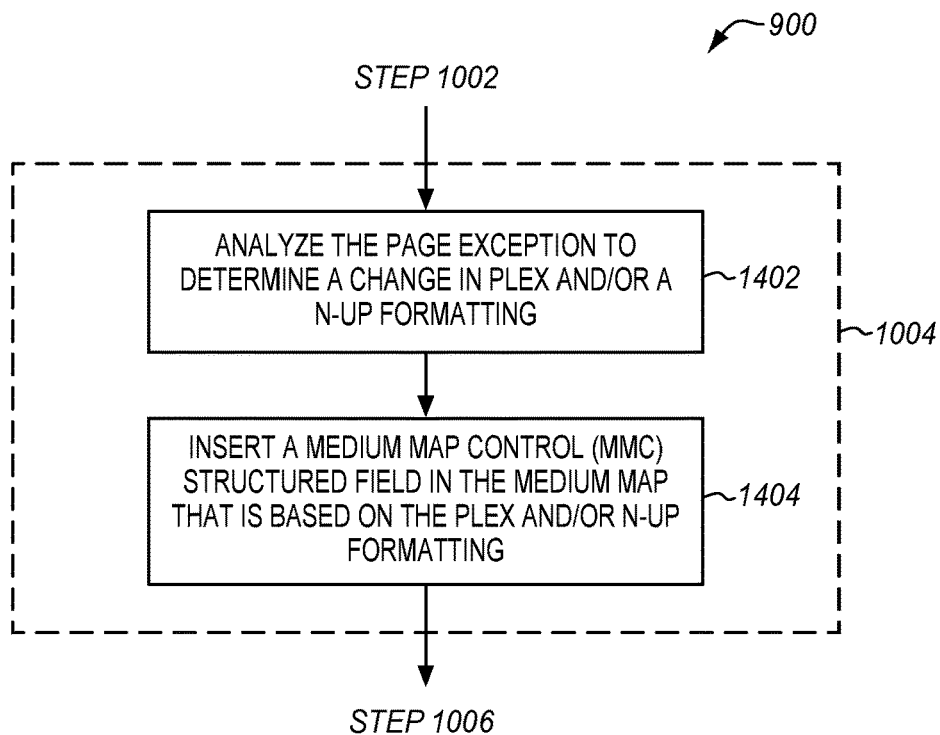
Figure 15:
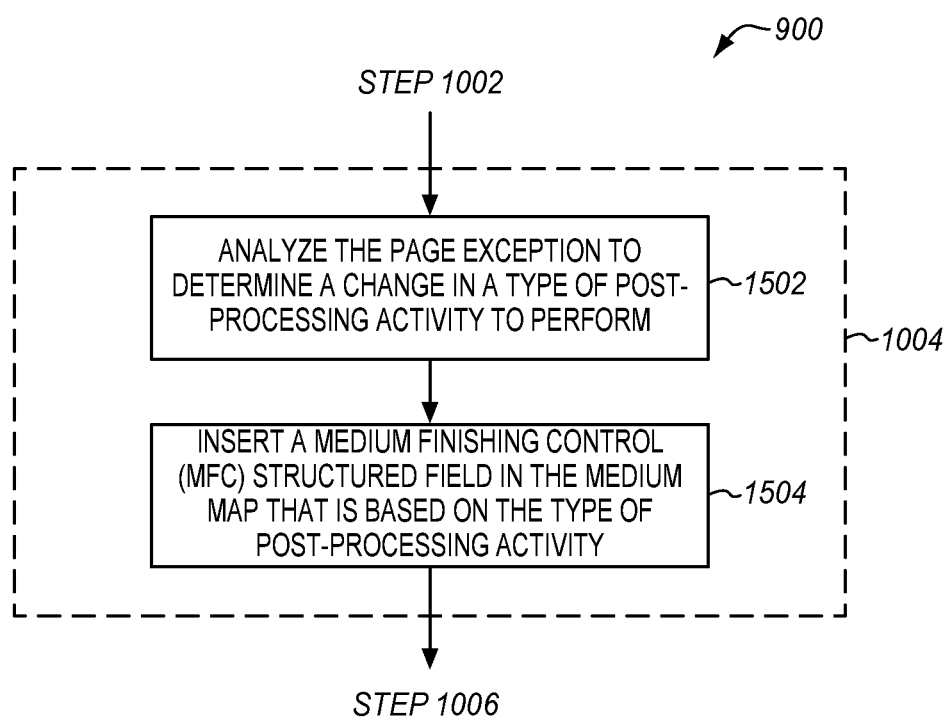

FIG. 9 is a flow chart of a method 900 of modifying AFP translations to handle page exceptions in an illustrative embodiment. FIGS. 10-15 are flow charts depicting additional details of method 900 in illustrative embodiments. The steps of method 900 will be described with respect to controller 802 of FIG. 8, although one skilled in the art will understand that method 900 may be performed by other systems not shown. The steps of method 900 are not all inclusive and may include other steps not shown. The steps may also be performed in an alternate order.

To begin a process of modifying AFP translation 114 to handle page exceptions 110, processor 804 receives job ticket 108, which defines page exceptions 110 for non-AFP print job 106 (see step 902). Processor 804 also receives AFP translation 114, which is a translation of non-AFP print job 106 into MO:DCA that does not implement one or more of page exceptions 110 (see step 904). Processor 804 modifies AFP translation 114 based on page exceptions 110 to generate modified AFP translation 706 (see step 906). Modified AFP translation 706, which correctly represents both the printable data in non-AFP print job 106 and page exceptions 110 defined in job ticket 108, is provided to print server 116 for generating a printed output (see step 908). Print server 116 converts modified AFP translation 706 into an IPDS data stream, which is sent to IPDS printer 112. IPDS printer 112 generates printed output 708, which is a correct representation of non-AFP print job 106 including page exceptions 110 defined in job ticket 108. Thus, exception handler 704 enables print shop architecture 702 to print non-AFP print job 106 correctly based on job ticket 108, even though print shop architecture 702 may not be able to print non-AFP print job 106 directly without the use of translator 102, thereby providing a technical benefit over print shop 100 of FIG. 1.

Figure 16:
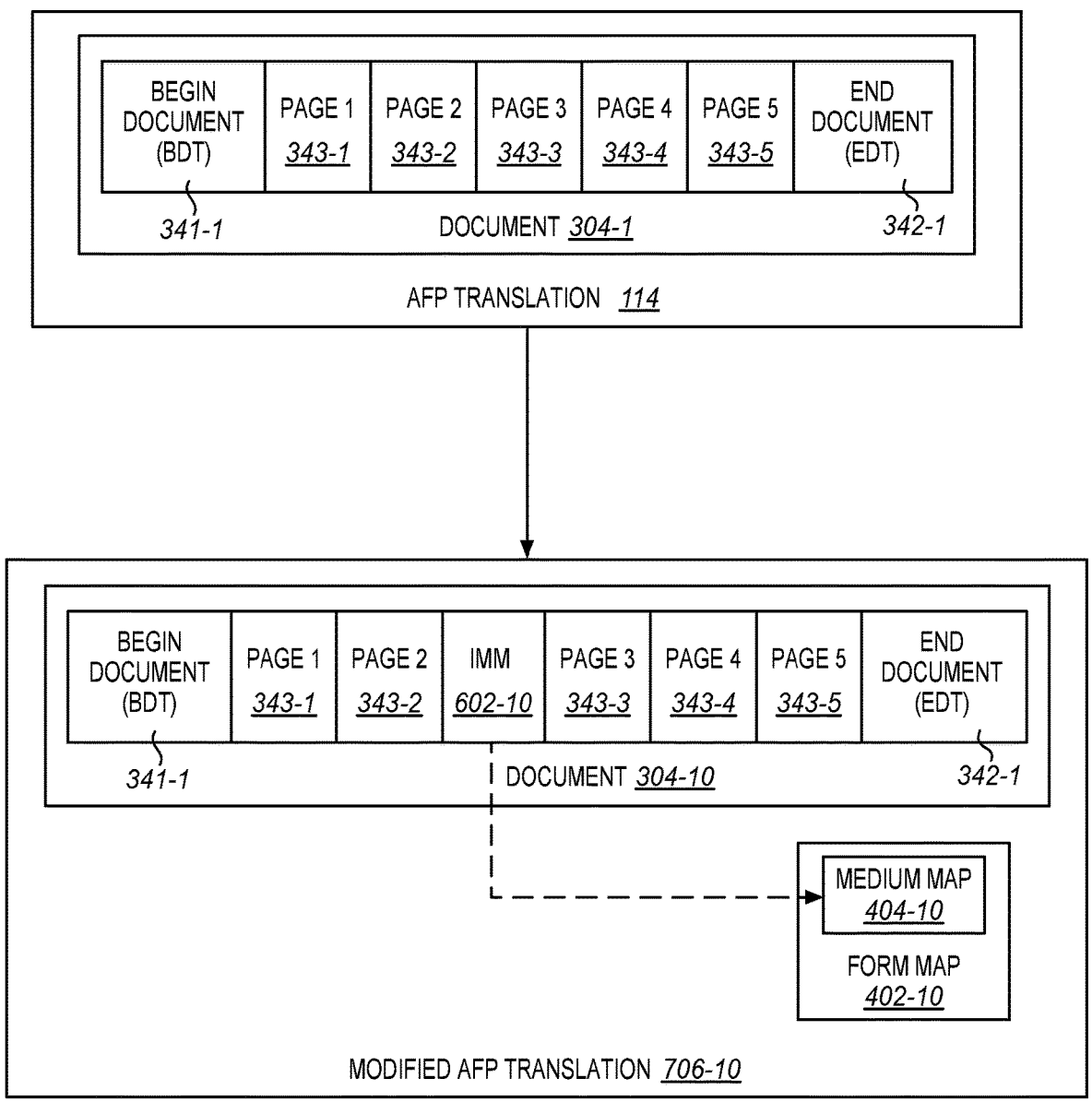
FIG. 16-22 are block diagrams depicting various examples of how a modified AFP translation may be generated from an AFP translation to implement exception handling in illustrative embodiments.

While generating modified AFP translation 706 may be performed in a number of different ways, in one embodiment processor 804 may process job ticket 108 to identify a page in non-AFP print job 106 having page exception 110 (see step 1002 of FIG. 10) and generate one or more medium maps 404 based on page exception 110 (see step 1004). In response to generating medium maps 404, processor 804 inserts medium maps 404 in AFP translation 114 (see step 1006). Processor 804 further inserts an IMM 602 structured field invoking the medium maps 404 in AFP translation 114 at a page boundary prior to the page having the exception in order to implement the print control changes (see step 1008). The IMM 602 structured field informs print server 116 of a print control change, such as a change in the type of media, a change in the media destination, a change in the number of copies, a change in plex or n-up formatting, and/or a change in a type of post-processing activity to perform. Referring to FIG. 16, for example, if AFP translation 114 includes a document 304-1 having page one 343-1 to page five 343-5, and page three 343-3 is identified as having a page exception, then processor 804 generates modified AFP translation 706 by creating and inserting form map 402-10 in AFP translation 114 (if not already present in AFP translation 114) and by creating and inserting medium map 404-10 in form map 402-10 that includes one or more of a MMT 502 structured field, a MMD 503 structured field, a MCC 504 structured field, a MCC 504 structured field, a MMC 505 structured field, and a MFC 506 structured field. Document 304-1 is modified into document 304-10 by creating and inserting an IMM 602-10 structured field referencing medium map 404-10 in modified AFP translation 706 at the page boundary between page two 343-2 and page three 343-3.

Figure 17:
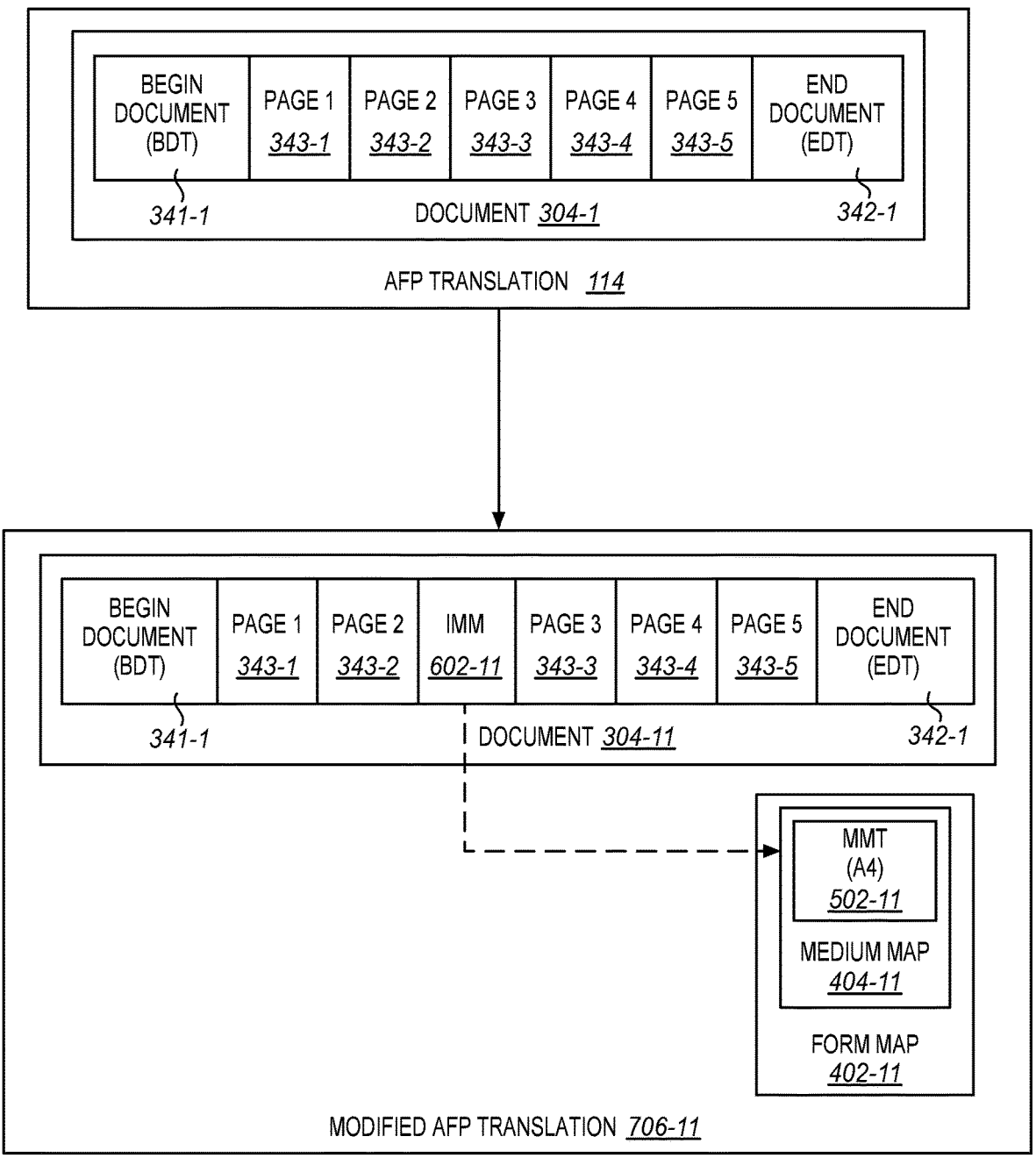

As discussed previously, different types of page exceptions 110 may exist for non-AFP print job 106. While the process of generating medium maps 404 may be performed in a number of different ways (see step 1004), in one embodiment, processor 804 determines that page exception 110 comprises a change in a type of media (see FIG. 11, step 1102). In response to processor 804 determining that page exception 110 comprises a change in a type of media, processor 804 inserts an MMT 502 structured field in one or more medium maps 404 that is based on the type of media (see step 1104). Processor 804 further inserts an IMM 602 structured field invoking the medium map 404 having the MMT 502 structured field in AFP translation 114 at a page boundary prior to the page having the exception (see step 1008). Referring to FIG. 17, for example, page exception 110 may define that a change in a type of media occurs at page three 343-3 to ISO A4 white (210×297 millimeters). Processor 804 generates modified AFP translation 706 by creating and inserting medium map 404-12 in form map 402-12, and creating and inserting an MMT 502-11 structured field in medium map 404-11 that reference the Encoded Media-Type OID associated with the ISO A4 media name. Processor 804 inserts an IMM 602-11 structured field in document 304-11 referencing medium map 404-11 at the page boundary between page two 343-2 and page three 343-3.

Figure 18:
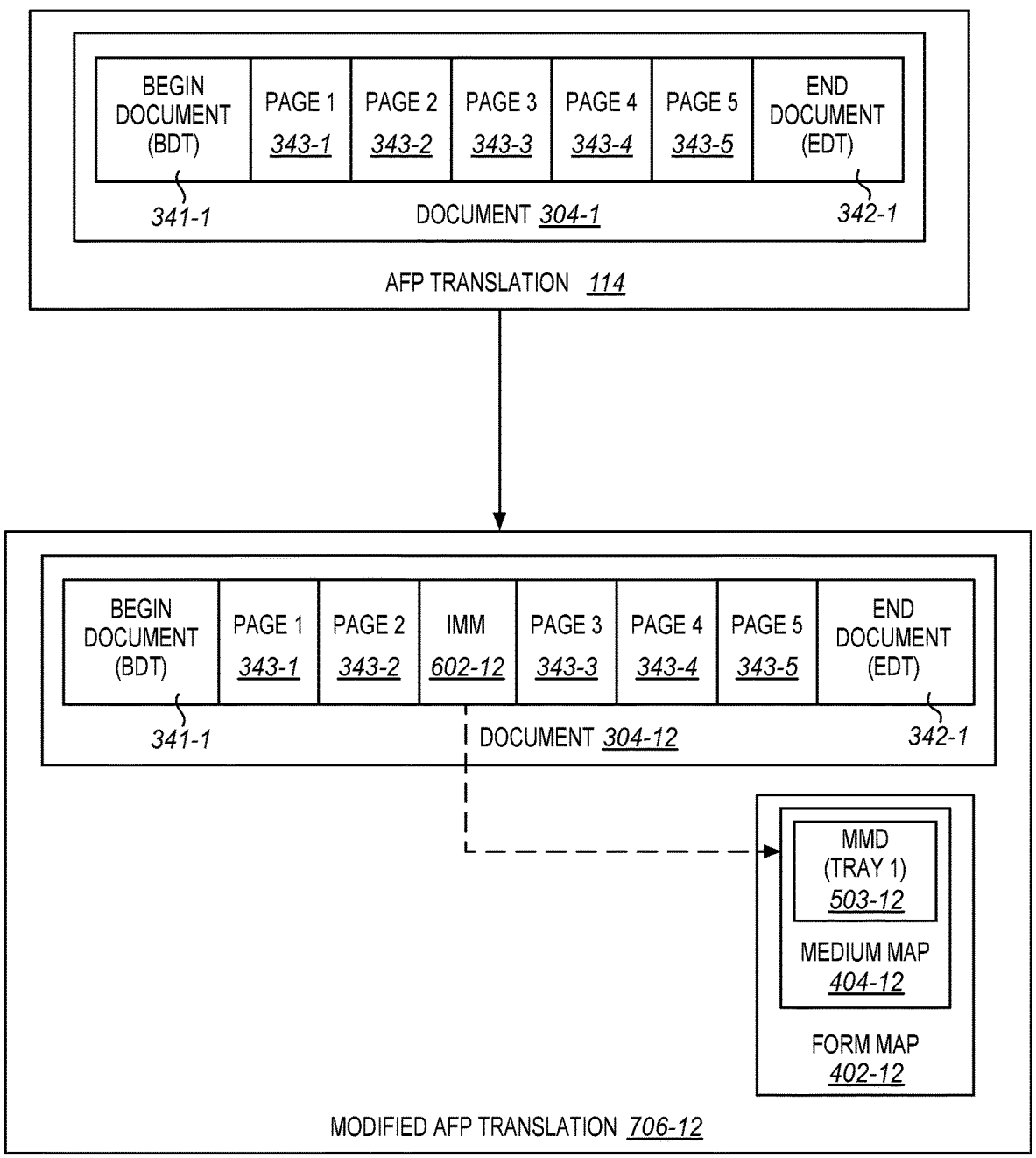

In another embodiment of generating medium map 404 (see step 1004), processor 804 determines that page exception 110 comprises a change in a media destination at IPDS printer 112 (see FIG. 12, step 1202), and inserts an MMD 503 structured field in one or more medium maps 404 that is based on the media destination (see step 1204). Referring to FIG. 18, for example, page exception 110 may specify a media destination change to document tray one at IPDS printer 112 occurs at page three 343-3. Processor 804 generates modified AFP translation 706 by creating and inserting medium map 404-12 in form map 402-12, and creating and inserting an MMD 503-12 structured field in medium map 404-12 that specifies document tray one. Processor 804 then inserts an IMM 602-12 structured field in document 304-10 invoking medium map 404-12 at the page boundary between page two 343-2 and page three 343-3.

Figure 19:
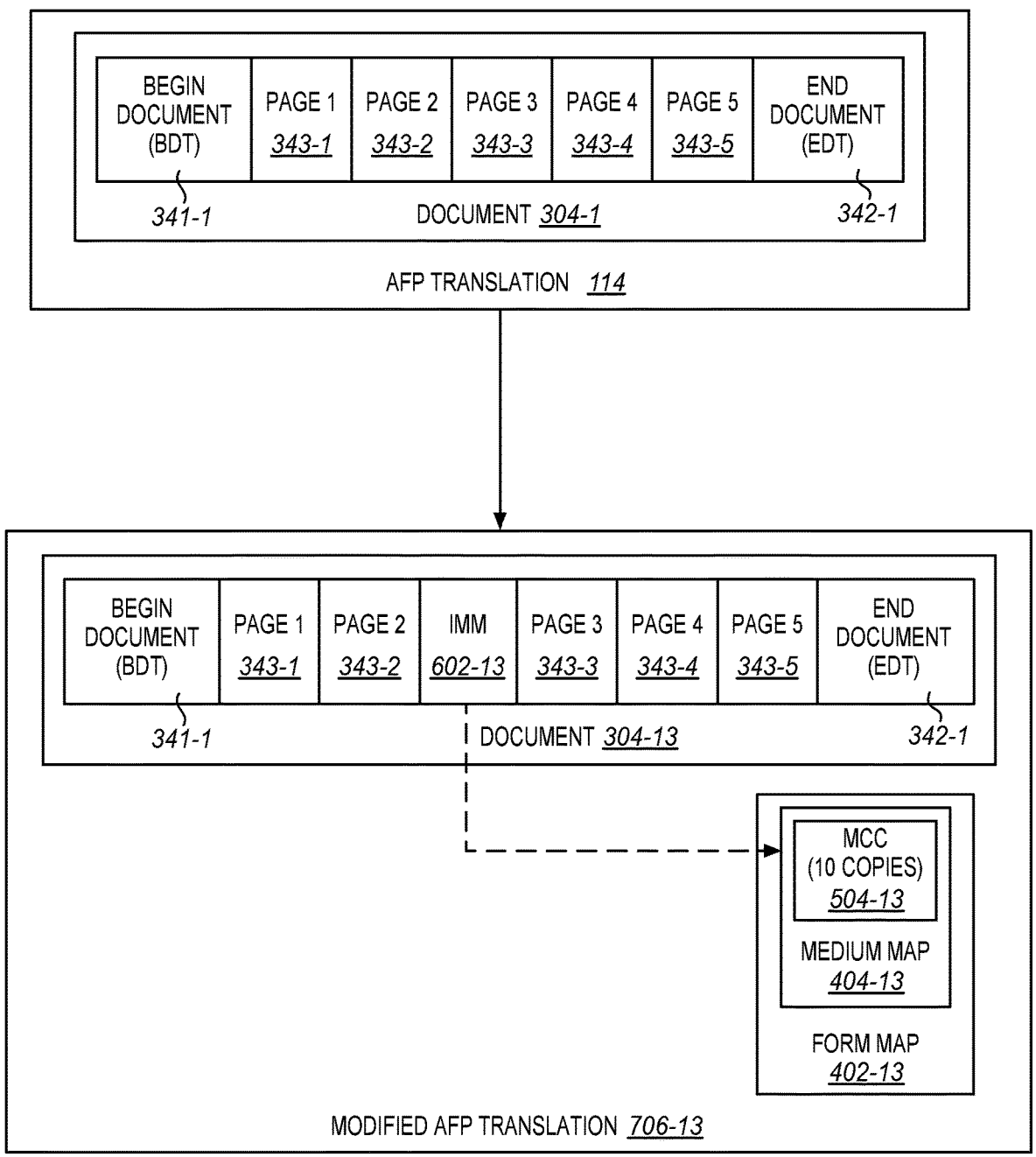

In another embodiment of generating medium map 404 (see step 1004), processor 804 determines that page exception 110 comprises a change in a number of copies to print (see FIG. 13, step 1302), and inserts an MCC 504 structured field in one or more medium maps 404 that is based on the number of copies (see step 1304). Referring to FIG. 19, for example, page exception 110 may specify that a change to 10-copy printing occurs at page three 343-3. Processor 804 generates modified AFP translation 706 by creating and inserting medium map 404-13 in form map 402-13, and creating and inserting an MCC 504-13 structured field in medium map 404-13 that specifies ten copies. Processor 804 then inserts an IMM 602-13 structured field in document 304-13 invoking medium map 404-13 at the page boundary between page two 343-2 and page three 343-3.

Figure 20:
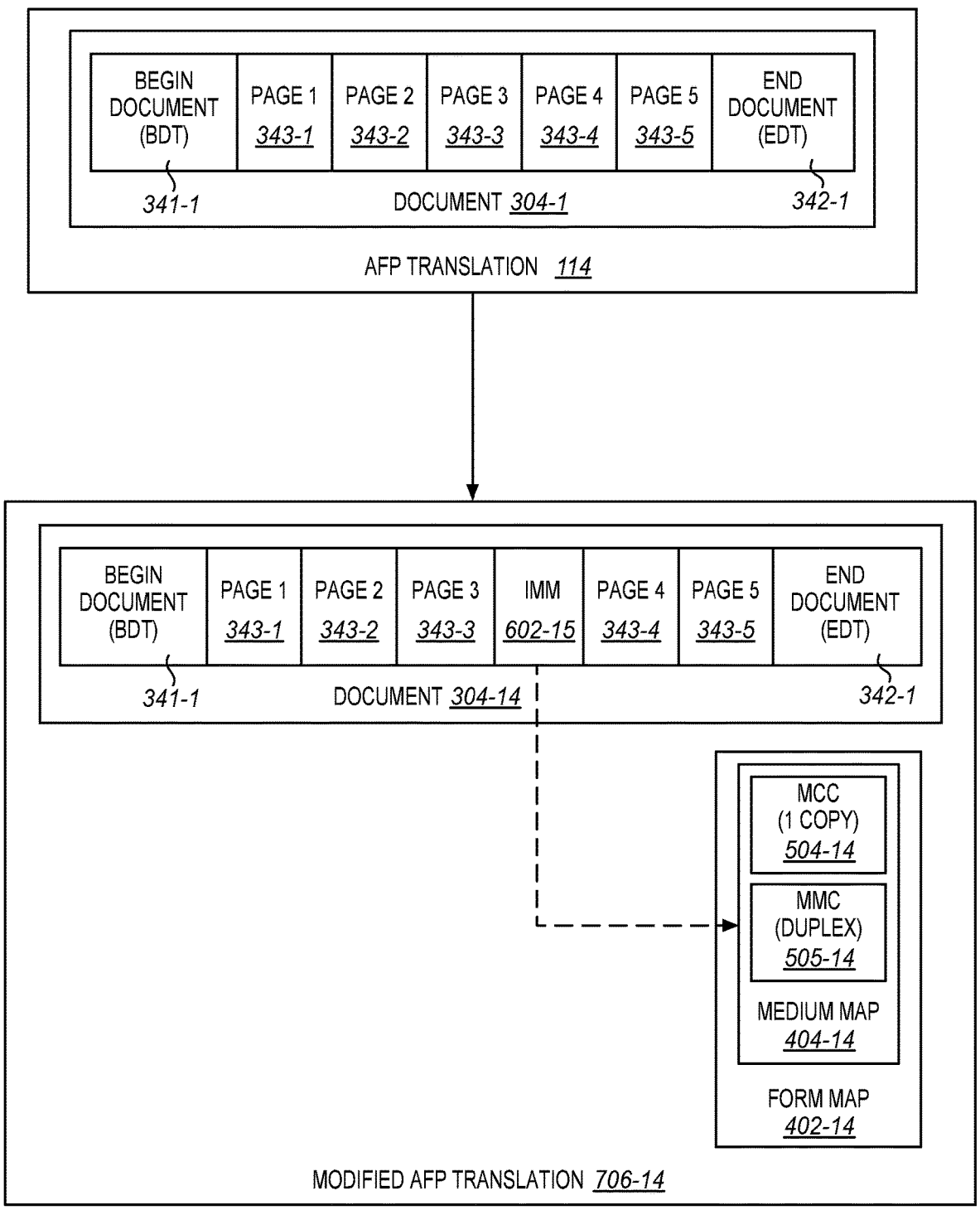

In another embodiment of generating medium map 404 (see step 1004), processor 804 determines that page exception 110 comprises a change in the plex and/or the n-up formatting (see FIG. 14, step 1402), and inserts an MMC 505 structured field in one or more medium maps 404 that is based on the plex and/or the n-up formatting (see step 1404). Referring to FIG. 20, for example, page exception 110 may specify that page four 343-4 to page five 343-5 are printed single copy duplex. Processor 804 generates modified AFP translation 706 by creating and inserting medium map 404-14 in form map 402-14, and creating and inserting an MCC 504-14 structured field in medium map 404-13 that specifies one copy for the copy group of page four 343-4 to page five 343-5. Processor 804 also creates and inserts an MMC 505-14 structured field that specifies duplex in medium map 404-14 that is referenced by MCC 504-14 structured field. Processor 804 then inserts an IMM 602-14 structured field in document 304-14 invoking medium map 404-14 at the page boundary between page three 343-3 and page four 343-4.

Figure 21:
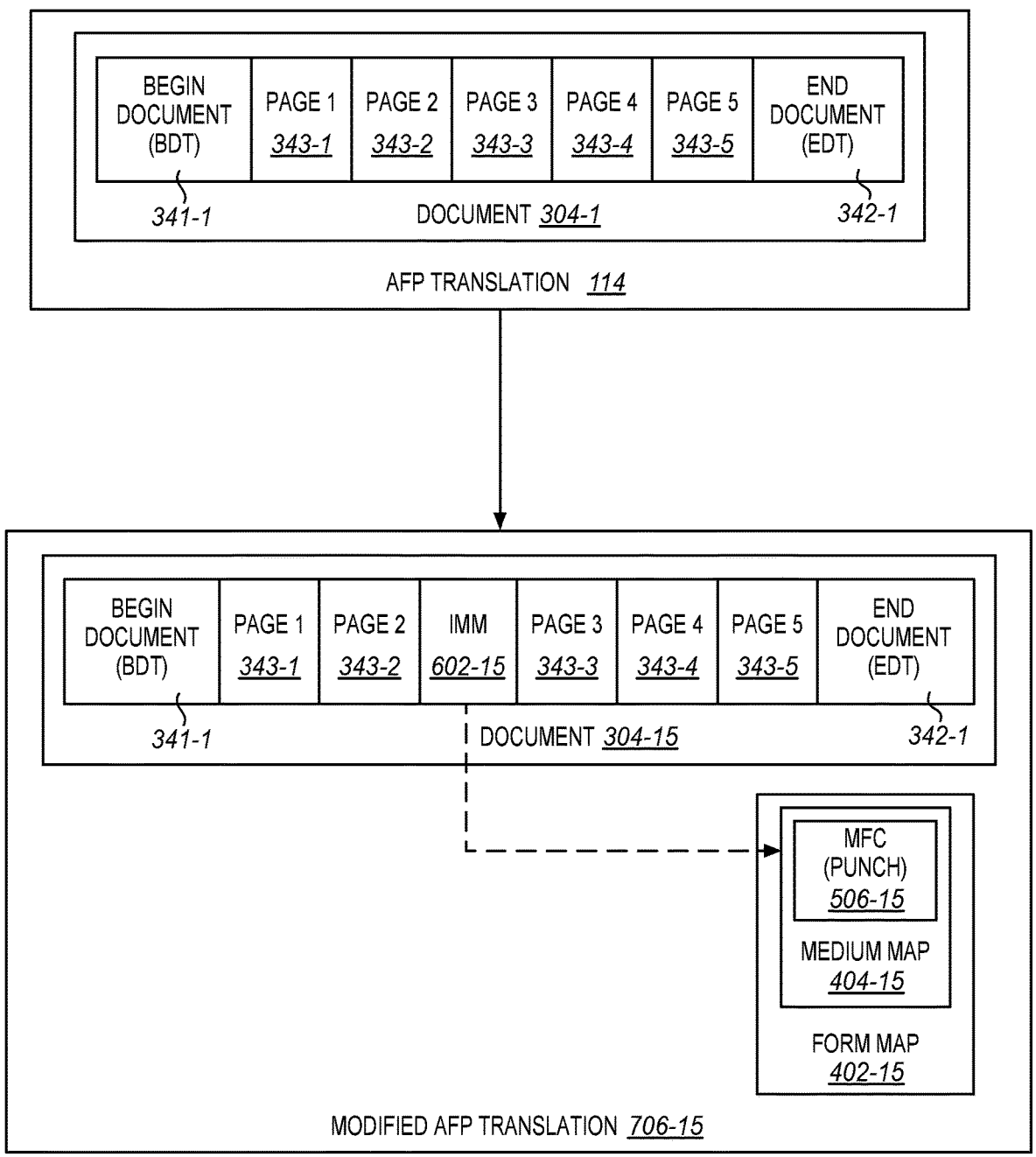

In another embodiment of generating medium map 404 (see step 1004), processor 804 determines that page exception 110 comprises a change in a type of post-processing or post-print activity to perform after printing modified AFP translation 706 (see FIG. 15, step 1502), and inserts an MFC 506 structured field in one or more medium maps 404 that is based on the type of post-processing activity (see step 1504). Referring to FIG. 21, for example, page exception 110 may specify change in the type of post-processing to punch occurs at page three 343-3. Processor 804 generates modified AFP translation 706 by creating and inserting medium map 404-15 in form map 402-15, and creating and inserting an MFC 506-15 structured field in medium map 404-15. Processor 804 then inserts an IMM 602-15 structured field in document 304-15 invoking medium map 404-14 at the page boundary between page three 343-3 and page four 343-4.

Figure 22:
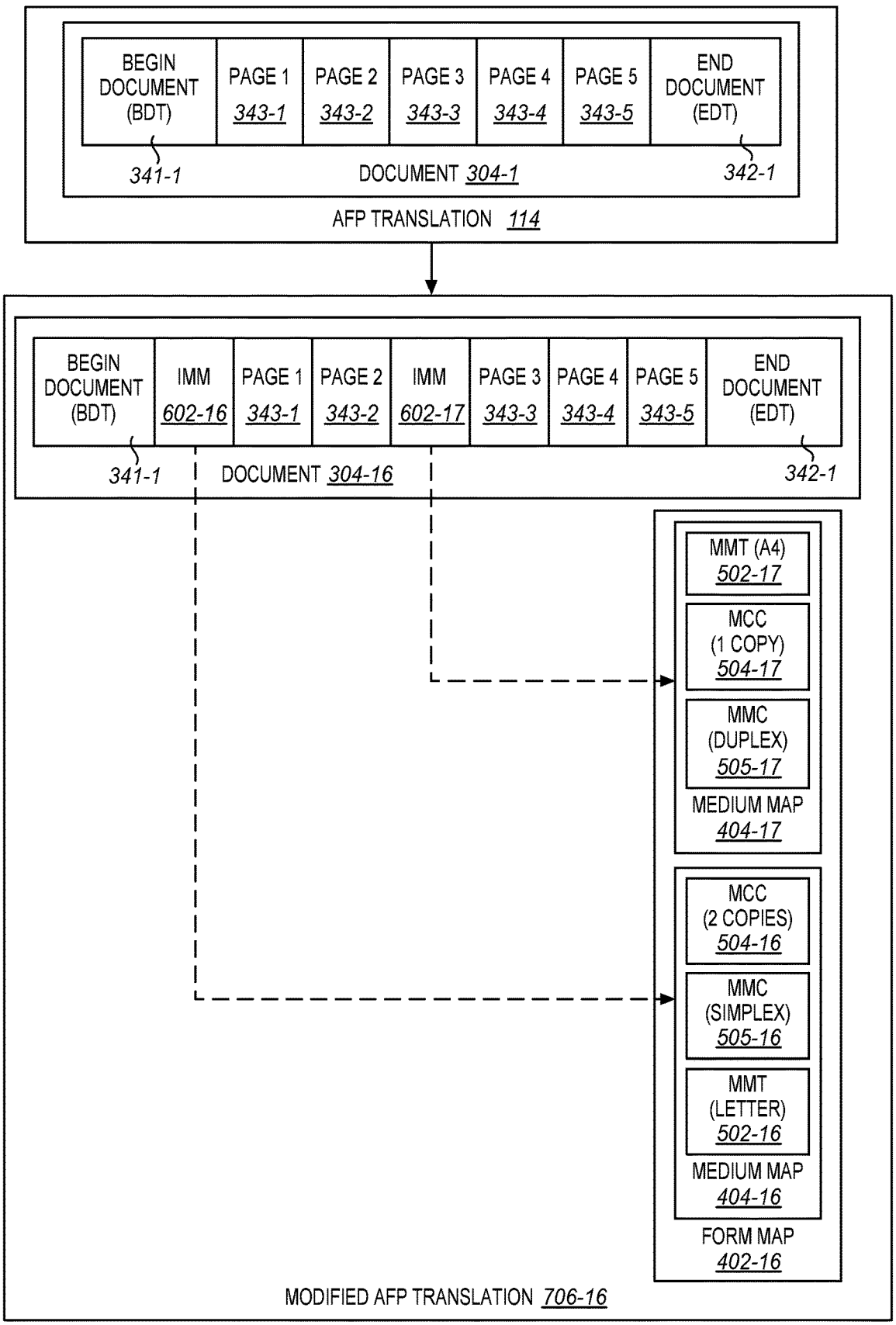

Although method 900 has been described with respect to single examples of the use of a MMT 502 structured field, a MMD 503 structured field, a MCC 504 structured field, a MCC 504 structured field, a MMC 505 structured field, and a MFC 506 structured field to handle page exceptions 110, combinations of a MMT 502 structured field, a MMD 503 structured field, a MCC 504 structured field, a MCC 504 structured field, a MMC 505 structured field, and a MFC 506 structured field may be used depending on the complexity and type of print control changes detailed in page exceptions 110. Referring to FIG. 22, for example, processor 804 processes page exceptions 110 in job ticket 108 along with AFP translation 114 generated by translator 102 to generate modified AFP translation 706 that properly reflects both the printable output of non-AFP print job 106 and page exceptions 110 defined in job ticket 108. In the example, processor 804 determines that page one 343-1 to page two 343-2 in AFP translation 114 are specified to print simplex with two copies of each on letter, and page three 343-3 to page five 343-5 are specified to print duplex with one copy of each on A4. In order to ensure a correctly printed output for AFP translation 114 that properly reflects page exceptions 110 in job ticket 108, processor 804 creates modified AFP translation 706, including document 304-16 and form map 402-16 by modifying AFP translation 114. Form map 402-16 includes medium map 404-16 and medium map 404-17. Medium map 404-16 describes the print control for page one 343-1 to page two 343-2, and medium map 404-17 describes the print control for page three 343-3 to page five 343-5. As page one 343-1 to page two 343-2 specify a type of media, plex, and a number of copies, processor 804 generates an MCC 504-16 structured field specifying two copies, an MMC 505-16 structured field specifying simplex, and a MMT 502-16 structured field specifying letter media, and inserts the structured fields in medium map 404-16. An IMM 602-16 structured field is inserted at the page boundary prior to page one 343-1 which invokes medium map 404-16 to correctly implement the print control for page one 343-1 to page two 343-2.

As page three 343-3 to page five 343-5 specify a type of media, plex, and a number of copies, processor 804 generates an MCC 504-17 structured field specifying one copy, an MMC 505-17 structured field specifying duplex, and an MMT 502-17 structured field specifying A4 media, and inserts the structured fields in medium map 404-17. An IMM 602-17 structured field is inserted at the page boundary between page two 343-2 and page three 343-3 which invokes medium map 404-17 to correctly implement the print control for page three 343-3 to page five 343-5. When document 304-16 is converted into an IPDS data stream by print server 116 and submitted to IPDS printer 112, printed output 708 is generated which correctly represents the documents and the print control information represented by non-AFP print job 106 and job ticket 108 (see FIG. 5).

The embodiments described herein allow for an AFP print shop to correctly print non-AFP print jobs in cases where the AFP print shop may utilize IPDS printers that may not accept other types of formatted print data. This allows the AFP print shop to service a larger number of customers that may not have the capability of submitting AFP jobs to the AFP print shop, thereby improving the state of the art.

Figure 23:
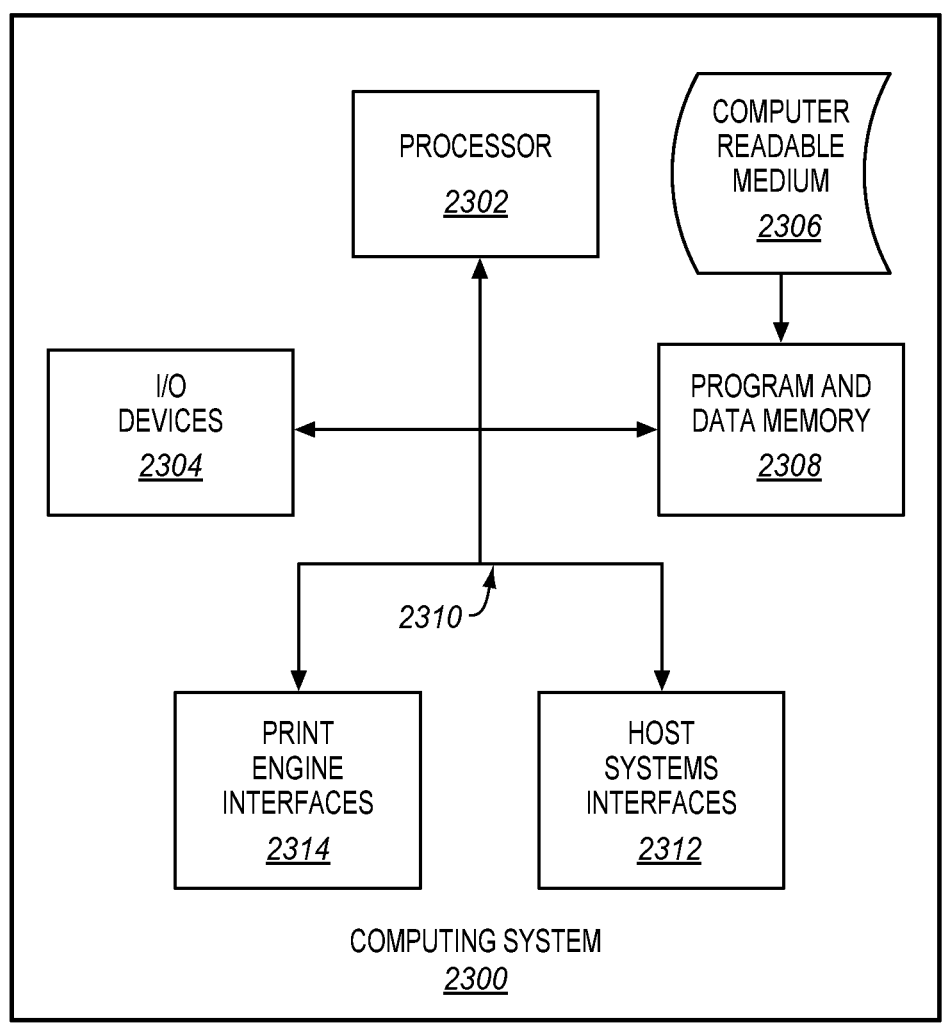
FIG. 23 is a block diagram illustrating a computer system operable to execute computer readable medium embodying programmed instructions to perform desired functions in an illustrative embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 23 illustrates a computing system 2300 in which a computer-readable medium 2306 may provide instructions for performing method 900 in an illustrative embodiment.

Furthermore, the invention can take the form of a computer program product accessible from a computer-usable or computer-readable medium 2306 providing program code for use by or in connection with a computer or any instruction execution system. For the purposes of this description, a computer-usable or computer-readable medium 2306 can be any apparatus that can contain, store, communicate, propagate, or transport the program for use by or in connection with the instruction execution system, apparatus, or device.

The computer-readable medium 2306 can be an electronic, magnetic, optical, electromagnetic, infrared, or semiconductor system (or apparatus or device) or a propagation medium. Examples of a computer-readable medium 2306 include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor 2302 coupled directly or indirectly to memory 2308 through a system bus 2310. The memory 2308 can include local memory employed during actual execution of the program code, bulk storage, and cache memories which provide temporary storage of at least some program code in order to reduce the number of times code is retrieved from bulk storage during execution.

Input/output or I/O devices 2304 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 2312, or remote printers or storage devices through intervening private or public networks, such as through print engine interfaces 2314. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

What is claimed is:

1. An apparatus comprising:
   a controller configured to receive a job ticket for a non-AFP (Advanced Function Presentation) print job, wherein the job ticket defines one or more page-level exceptions for the non-AFP print job,
   the controller is configured to receive an AFP translation of the non-AFP print job from a translator that converts printable data of the non-AFP print job into a datastream to generate the AFP translation but ignores at least one of the page-level exceptions defined in the job ticket in generating the AFP translation,
   the controller is configured to modify the AFP translation based on the job ticket by converting at least one of the page-level exceptions defined in the job ticket to a page-range exception, and including one or more structured fields in the AFP translation based on the page-range exception, and
   the controller is configured to provide the modified AFP translation to a print server to generate a printed output that represents the non-AFP print job as specified by the job ticket.

2. The apparatus of claim 1, wherein:
the printable data of the non-AFP print job comprises a document that includes a plurality of pages, and the AFP translation comprises page components that represent the pages in the document,
the controller is configured to process the job ticket to identify a page of the document having a page-level exception, to generate a medium map based on the page-level exception that includes print control changes, and to modify the AFP translation to include the medium map,
the controller is configured to modify the AFP translation to insert an Invoke Medium Map (IMM) structured field referencing the medium map at a page boundary prior to a page component in the AFP translation that represents the page in the document, and
the print control changes implemented in the medium map remain in effect for the page components of the AFP translation that follow the page component until a subsequent IMM structured field invokes a different medium map.

3. The apparatus of claim 2, wherein:
the controller is further configured to determine that the page-level exception specified for the page of the document comprises a change in a type of media, and to insert a Map Media Type (MMT) structured field in the medium map of the AFP translation that is based on the type of media.

4. The apparatus of claim 2, wherein:
the controller is further configured to determine that the page-level exception specified for the page of the document comprises a change in a media destination at a printer, and to insert a Map Media Destination (MMD) structured field in the medium map of the AFP translation that is based on the media destination.

5. The apparatus of claim 2, wherein:
the controller is further configured to determine that the page-level exception specified for the page of the document comprises a change in a number of copies to print, and to insert a Medium Copy Count (MCC) structured field in the medium map of the AFP translation that identifies the number of copies.

6. The apparatus of claim 2, wherein:
the controller is further configured to determine that the page-level exception specified for the page of the document comprises a change in a plex, and to insert a Medium Modification Control (MMC) structured field in the medium map of the AFP translation that is based on the plex.

7. The apparatus of claim 2, wherein:
the controller is further configured to determine that the page-level exception specified for the page of the document comprises a change in an n-up formatting, and to insert a Medium Modification Control (MMC) structured field in the medium map of the AFP translation that is based on the n-up formatting.

8. The apparatus of claim 2, wherein:
the controller is further configured to determine that the page-level exception specified for the page of the document comprises a change in a type of post-processing activity to perform, and to insert a Medium Finishing Control (MFC) structured field in the medium map of the AFP translation that is based on the type of post-processing activity.

9. A method, comprising:
receiving a job ticket for a non-AFP (Advanced Function Presentation) print job, wherein the job ticket defines one or more page-level exceptions for the non-AFP print job;
receiving an AFP translation of the non-AFP print job from a translator that converts printable data of the non-AFP print job into a datastream to generate the AFP translation but ignores at least one of the page-level exceptions defined in the job ticket in generating the AFP translation;
modifying the AFP translation based on the job ticket by converting at least one of the page-level exceptions defined in the job ticket to a page-range exception, and including one or more structured fields in the AFP translation based on the page-range exception; and
providing the modified AFP translation to a print server to generate a printed output that represents the non-AFP print job as specified by the job ticket.

10. The method of claim 9, wherein:
the printable data of the non-AFP print job comprises a document that includes a plurality of pages, and the AFP translation comprises page components that represent the pages in the document; and
modifying the AFP translation comprises:
processing the job ticket to identify a page of the document having a page-level exception;
generating a medium map based on the page-level exception that includes print control changes;
inserting the medium map in the AFP translation; and
inserting an Invoke Medium Map (IMM) structured field referencing the medium map at a page boundary prior to a page component in the AFP translation that represents the page in the document,
wherein the print control changes implemented in the medium map remain in effect for the page components of the AFP translation that follow the page component until a subsequent IMM structured field invokes a different medium map.

11. The method of claim 10, wherein generating the medium map further comprises:
determining that the page-level exception specified for the page of the document comprises a change in a type of media; and
inserting a Map Media Type (MMT) structured field in the medium map of the AFP translation that is based on the type of media.

12. The method of claim 10, wherein generating the medium map further comprises:
determining that the page-level exception specified for the page of the document comprises a change in a media destination at a printer; and
inserting a Map Media Destination (MMD) structured field in the medium map of the AFP translation that is based on the media destination.

13. The method of claim 10, wherein generating the medium map further comprises:
determining that the page-level exception specified for the page of the document comprises a change in a number of copies to print; and
inserting a Medium Copy Count (MCC) structured field in the medium map of the AFP translation that is based on the number of copies.

14. The method of claim 10, wherein generating the medium map further comprises:
determining that the page-level exception specified for the page of the document comprises a change in a plex; and inserting a Medium Modification Control (MMC) structured field in the medium map of the AFP translation that is based on the plex.

15. The method of claim 10, wherein generating the medium map further comprises:
   determining that the page-level exception specified for the page of the document comprises a change in an n-up formatting; and
   inserting a Medium Modification Control (MMC) structured field in the medium map of the AFP translation that is based on the n-up formatting.

16. The method of claim 10, wherein generating the medium map further comprises:
   determining that the page-level exception specified for the page of the document comprises a change in a type of post-processing activity to perform; and
   inserting a Medium Finishing Control (MFC) structured field in the medium map of the AFP translation that is based on the type of post-processing activity.

17. A non-transitory computer-readable medium comprising programmed instructions which, when executed by a processor, direct the processor to:
   receive a job ticket for a non-AFP (Advanced Function Presentation) print job, wherein the job ticket defines one or more page-level exceptions for the non-AFP print job;
   receive an AFP translation of the non-AFP print job from a translator that converts printable data of the non-AFP print job into a datastream to generate the AFP translation but ignores at least one of the page-level exceptions page exception defined in the job ticket in generating the AFP translation;
   modify the AFP translation based on the job ticket by converting at least one of the page-level exceptions defined in the job ticket to a page-range exception, and including one or more structured fields in the AFP translation based on the page-range exception; and
   provide the modified AFP translation to a print server to generate a printed output that represents the non-AFP print job as specified by the job ticket.

18. The non-transitory computer-readable medium of claim 17, wherein:
   the printable data of the non-AFP print job comprises a document that includes a plurality of pages, and the AFP translation comprises page components that represent the pages in the document; and
   instructions directing the processor to modify the AFP translation comprise instructions to:
      process the job ticket to identify a page of the document having a page-level exception;
      generate a medium map based on the page-level exception that includes print control changes, and to modify the AFP translation to include the medium map; and
      insert an Invoke Medium Map (IMM) structured field referencing the medium map at a page boundary prior to a page component in the AFP translation that represents the page in the document,
      wherein the print control changes implemented in the medium map remain in effect for the page components of the AFP translation that follow the page component until a subsequent IMM structured field invokes a different medium map.

19. The non-transitory computer-readable medium of claim 18, wherein instructions directing the processor to generate the medium map comprise instructions to:
   determine that the page-level exception specified for the page of the document comprises a change in a type of media; and
   insert a Map Media Type (MMT) structured field in the medium map of the AFP translation that is based on the type of media.

20. The non-transitory computer-readable medium of claim 18, wherein instructions directing the processor to generate the medium map comprise instructions to:
   determine that the page-level exception specified for the page of the document comprises a change in a media destination at a printer; and
   insert a Map Media Destination (MMD) structured field in the medium map of the AFP translation that is based on the media destination.

21. The non-transitory computer-readable medium of claim 18, wherein instructions directing the processor to generate the medium map comprise instructions to:
   determine that the page-level exception specified for the page of the document comprises a change to a number of copies to print; and
   insert a Medium Copy Count (MCC) structured field in the medium map of the AFP translation that is based on the number of copies.

22. The non-transitory computer-readable medium of claim 18, wherein instructions directing the processor to generate the medium map comprise instructions to:
   determine that the page-level exception specified for the page of the document comprises change in a plex; and
   insert a Medium Modification Control (MMC) structured field in the medium map of the AFP translation that is based on the plex.

23. The non-transitory computer-readable medium of claim 18, wherein instructions directing the processor to generate the medium map comprise instructions to:
   determine that the page-level exception specified for the page of the document comprises a change in an n-up formatting; and
   insert a Medium Modification Control (MMC) structured field in the medium map of the AFP translation that is based on the n-up formatting.

24. The non-transitory computer-readable medium of claim 18, wherein instructions directing the processor to generate the medium map comprise instructions to:
   determine that the page-level exception specified for the page of the document comprises a change in a type of post-processing activity to perform; and
   insert a Medium Finishing Control (MFC) structured field in the medium map of the AFP translation that is based on the type of post-processing activity.

* * * * *